US010257420B2

(12) United States Patent
Matsuyama

(10) Patent No.: US 10,257,420 B2
(45) Date of Patent: Apr. 9, 2019

(54) IMAGE PROCESSING APPARATUS, OPTICAL APPARATUS, AND IMAGE PROCESSING METHOD

(71) Applicant: CANON KABUSHIKI KAISHA, Tokyo (JP)

(72) Inventor: Ichiro Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/667,129

(22) Filed: Aug. 2, 2017

(65) Prior Publication Data

US 2018/0041706 A1 Feb. 8, 2018

(30) Foreign Application Priority Data

Aug. 4, 2016 (JP) .................................. 2016-153916

(51) Int. Cl.
*H04N 5/232* (2006.01)
*H04N 5/235* (2006.01)

(52) U.S. Cl.
CPC ......... *H04N 5/23264* (2013.01); *H04N 5/235* (2013.01); *H04N 5/23277* (2013.01); *H04N 5/23229* (2013.01); *H04N 5/23254* (2013.01)

(58) Field of Classification Search
None
See application file for complete search history.

(56) References Cited

U.S. PATENT DOCUMENTS

| 6,594,403 | B1 * | 7/2003 | Bozdagi | H04N 1/3876 358/450 |
|---|---|---|---|---|
| 7,136,097 | B1 * | 11/2006 | Toyoda | G06T 1/20 348/222.1 |
| 9,973,691 | B2 * | 5/2018 | Kato | G06T 3/4038 |
| 2010/0157090 | A1 * | 6/2010 | Kobayashi | H04N 5/77 348/222.1 |
| 2011/0157386 | A1 * | 6/2011 | Ishii | H04N 5/232 348/211.4 |
| 2014/0362205 | A1 * | 12/2014 | Sasaki | G02B 21/367 348/79 |

FOREIGN PATENT DOCUMENTS

| JP | 2008-259076 A | 10/2008 |
|---|---|---|
| JP | 2011-097474 A | 5/2011 |
| JP | 2013-131042 A | 7/2013 |
| JP | 5432697 B2 | 3/2014 |
| JP | 2014-064143 A | 4/2014 |

* cited by examiner

*Primary Examiner* — James M Hannett
(74) *Attorney, Agent, or Firm* — Canon U.S.A., Inc. IP Division

(57) ABSTRACT

An image processing apparatus includes a division unit configured to divide one frame image into a plurality of divided images, a plurality of image processing units configured to respectively process the plurality of divided images, and a combining unit configured to combine the divided images respectively subjected to image deformation processing by the plurality of image processing units, wherein the division unit changes an amount of overlap between the plurality of divided images according to a deformation amount of the image deformation processing performed on the divided image calculated by the image processing unit.

10 Claims, 18 Drawing Sheets

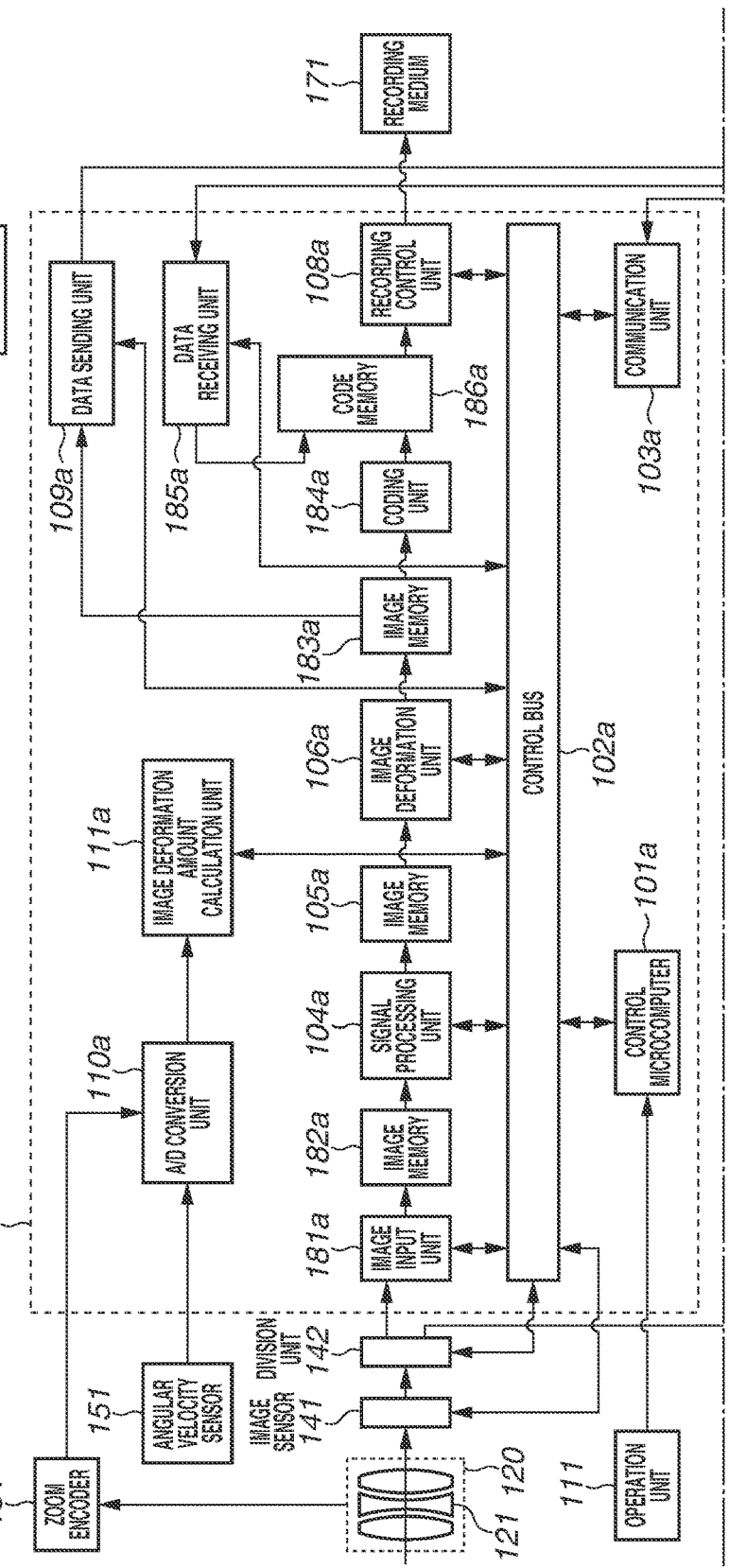

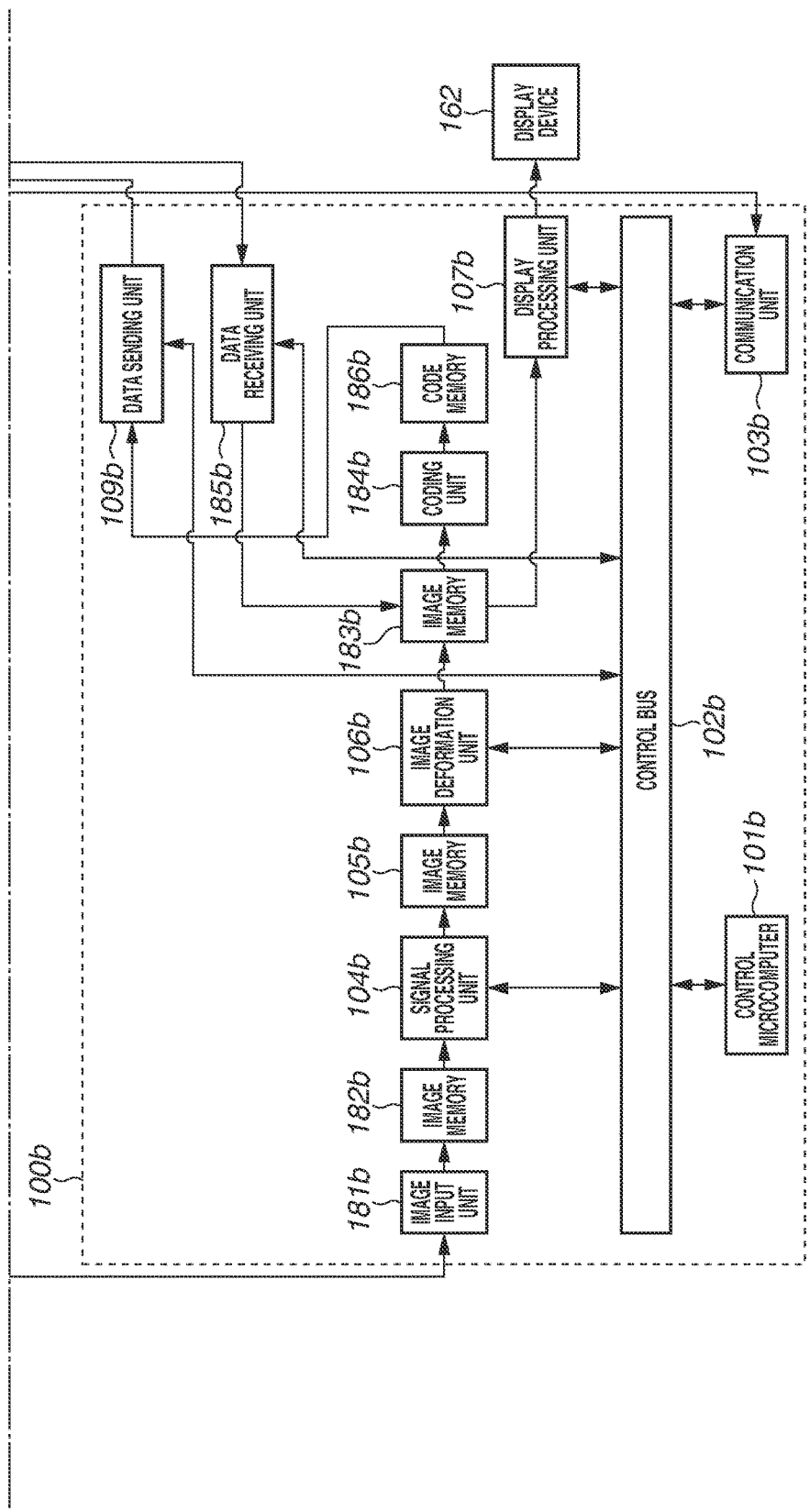

CAPTURED IMAGE

211 DIVIDED IMAGE

OVERLAP

212 DIVIDED IMAGE

221 SIGNAL-PROCESSED AND DEFORMED IMAGE

222 SIGNAL-PROCESSED AND DEFORMED IMAGE

DISPLAY IMAGE

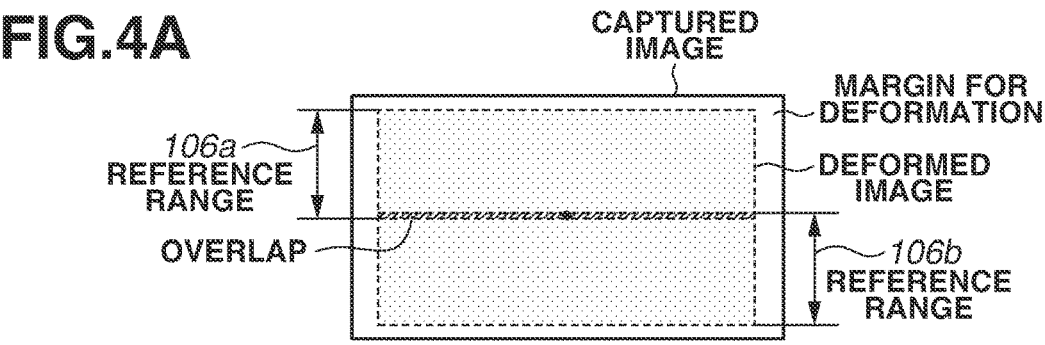
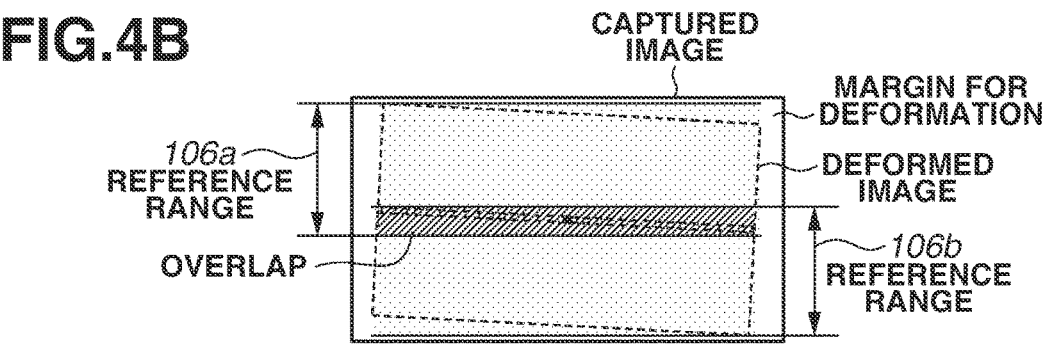
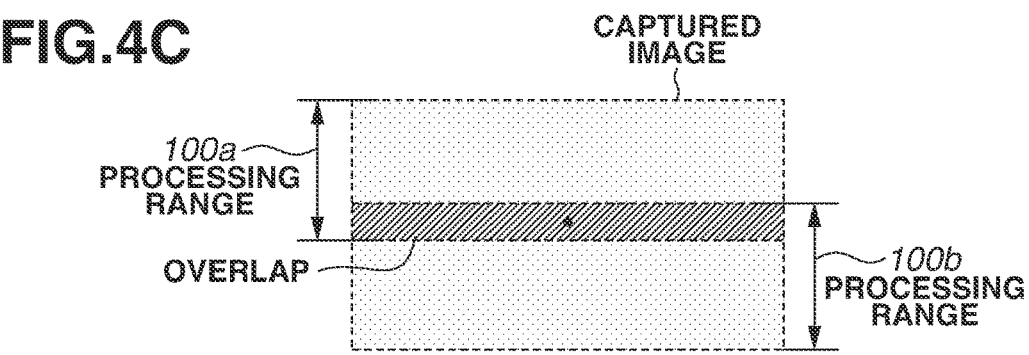
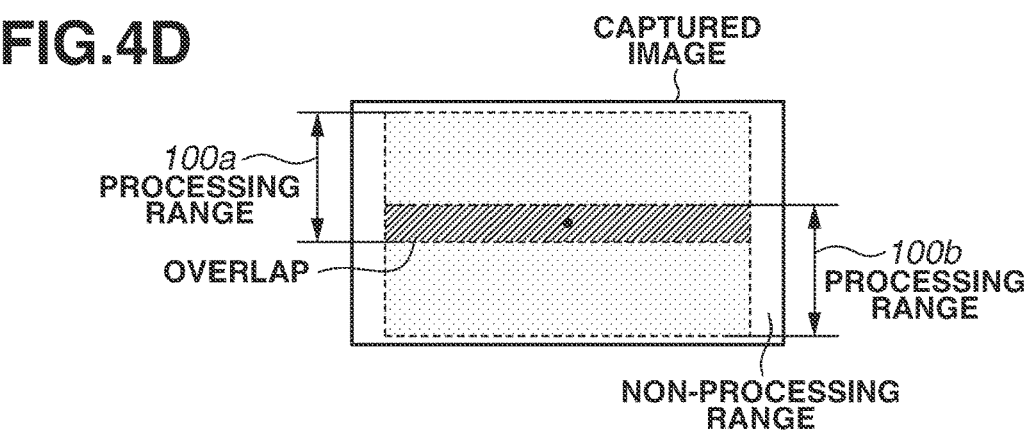

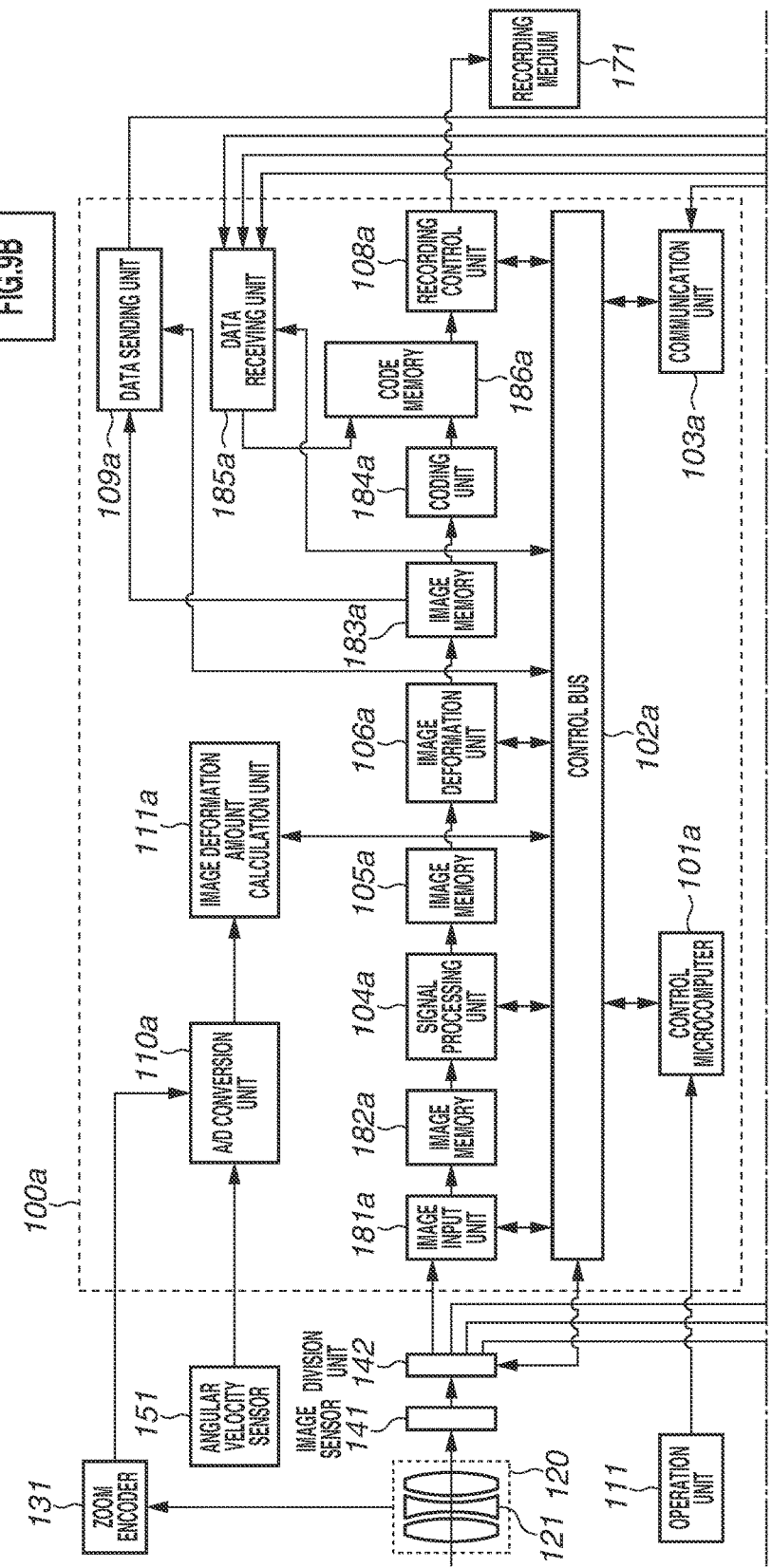

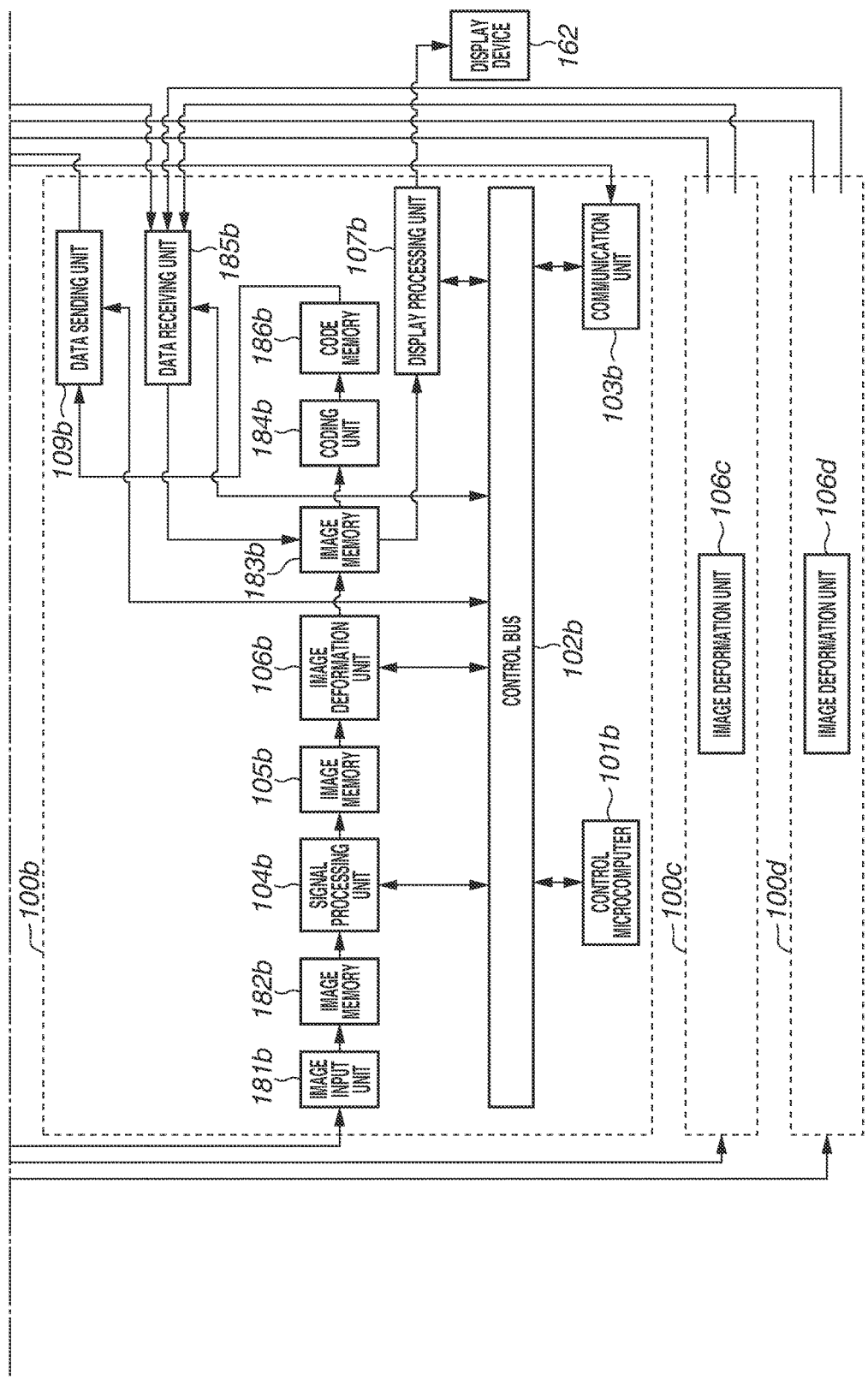

CAPTURED IMAGE

DISPLAY IMAGE

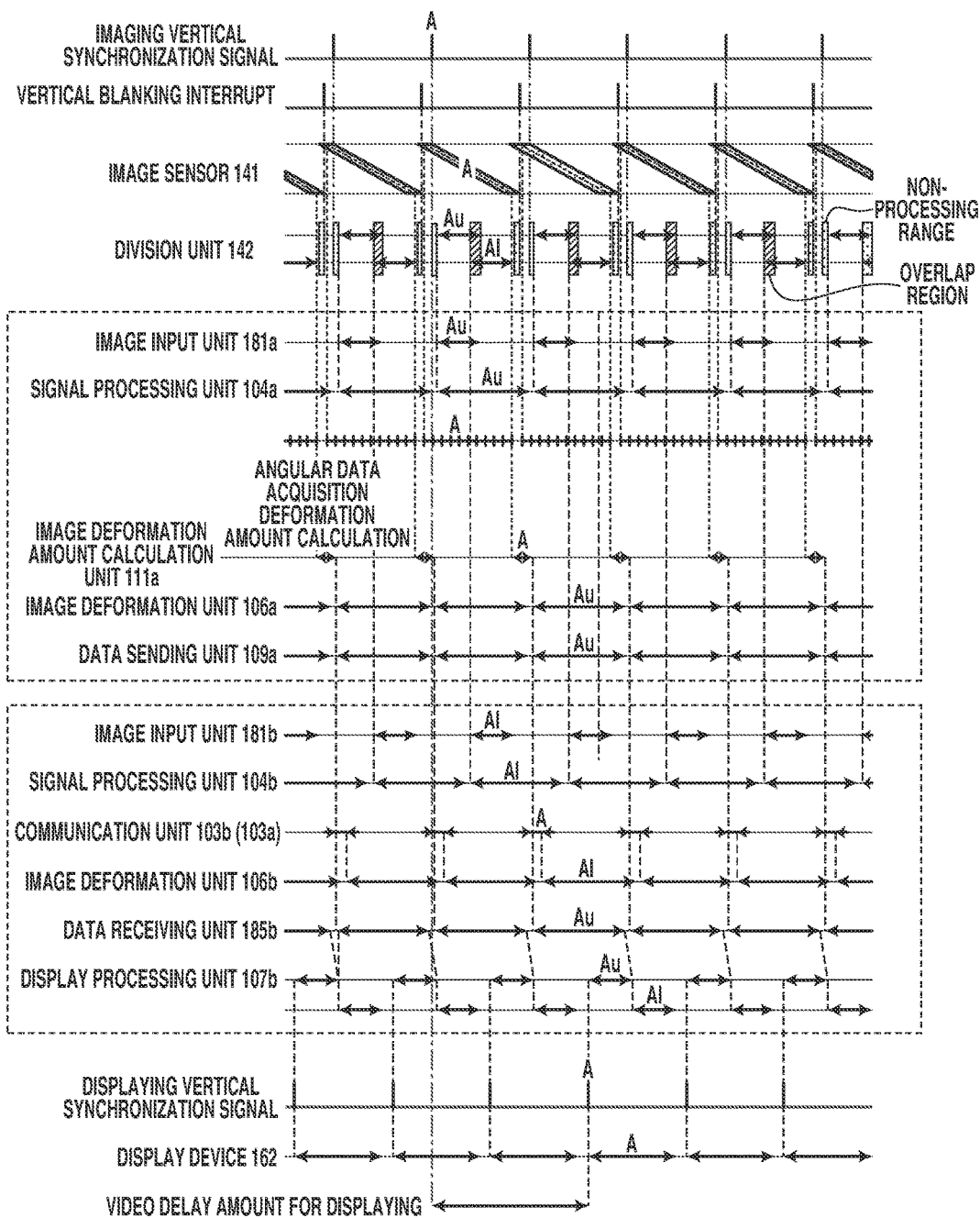

IMAGE PROCESSING APPARATUS, OPTICAL APPARATUS, AND IMAGE PROCESSING METHOD

BACKGROUND OF THE INVENTION

Field of the Invention

Aspects of the present invention generally relate to an image processing apparatus which divides an input image and performs image processing on the divided images. The image processing apparatus is applied to an optical apparatus, such as a digital still camera and a digital video camera.

Description of the Related Art

In recent years, cameras having such a higher resolution as to be compatible with 4K (a resolution of 3840×2160 pixels) have been developed.

In such an apparatus, in a case where the use of only one image processing processor (image processing large-scale integration (LSI)) leads to lack of image processing ability, a technique is employed which cuts out a plurality of divided images from one input image and concurrently performs image processing on the plurality of divided images with the use of a plurality of image processing processors.

In a case where an input image is divided into a plurality of divided images and image processing is performed on the divided images, in order to prevent the continuity of an image from being lost at a boundary portion between the divided images, a technique has been disclosed which performs image processing while causing parts of adjacent divided images to overlap each other.

For example, in the technique discussed in Japanese Patent Application Laid-Open No. 2011-97474, when a plurality of divided images is cut out from an input image, an overlap region is provided with respect to mutually adjacent divided images and image processing is performed with the inclusion of the overlap region.

Furthermore, in the technique discussed in Japanese Patent Application Laid-Open No. 2013-131042, image processing processors send overlap regions of divided images to each other, and perform subsequent image processing after the overlap regions are pasted on the divided images by an image memory.

On the other hand, many recent cameras are equipped with a function (electronic image stabilization) of electronically correcting shaking occurring in a captured image due to movement of a camera body, such as what is called camera shake.

In such an apparatus, an image processing processor stores an input image in an image memory and performs correction of shaking occurring in a captured image by changing readout positions from the image memory on a pixel-by-pixel basis based on motion information about the camera body.

For example, in the technique discussed in Japanese Patent Application Laid-Open No. 2014-64143, besides shaking occurring in a captured image, rolling-shutter distortion of a complementary metal-oxide semiconductor (CMOS) image sensor or distortion aberration of an imaging lens is corrected by deforming an image based on the focal length of the imaging lens or a detection result provided by an angular velocity sensor.

However, satisfying both the technique which divides an input image and performs image processing with a plurality of image processing processors and the technique which corrects, for example, camera shake by changing readout positions on an image memory has not been conceived so far.

Camera shake is corrected by changing readout positions of divided images stored in the image memory. In that case, since readout positions are also changed at boundary portions between the divided images, large overlap regions need to be included in the respective divided images.

In order to implement camera shake correction such as that discussed in Japanese Patent Application Laid-Open No. 2014-64143 with a configuration discussed in Japanese Patent Application Laid-Open No. 2011-97474, each image processing processor is required to have an image processing ability to process a divided image including a larger overlap region.

For example, a 4K image is supposed to be divisionally processed by two image processing processors within a predetermined time. In that case, if each image processing processor has only about half of the processing ability, it is impossible to process a divided image including a large overlap region within the predetermined time.

In order to similarly implement camera shake correction with a configuration discussed in Japanese Patent Application Laid-Open No. 2013-131042, image processing processors need to send an overlap region of each divided image to each other. In that case, since a readout operation needs to be performed after pasting is performed by the image memory, the amount of video delay in outputting an image would become large.

SUMMARY OF THE INVENTION

Embodiments of the present invention provide an imaging apparatus capable of correcting shaking occurring in a captured image due to movement of the imaging apparatus with a minimum amount of video delay within the range of a predetermined image processing ability in a case where an input image is divided into divided images and a plurality of image processing processors performs image processing on the divided images.

According to embodiments of the present invention, an image processing apparatus includes a division unit configured to divide one frame image into a plurality of divided images, a plurality of image processing units configured to respectively process the plurality of divided images, and a combining unit configured to combine the divided images respectively subjected to image deformation processing by the plurality of image processing units, wherein the division unit changes an amount of overlap between the plurality of divided images according to a deformation amount of the image deformation processing performed on the divided image calculated by the image processing unit.

Further features of the present invention will become apparent from the following description of exemplary embodiments with reference to the attached drawings.

BRIEF DESCRIPTION OF THE DRAWINGS

FIG. 1, which is composed of FIGS. 1A and 1B, is a configuration diagram of an imaging apparatus according to a first exemplary embodiment of the invention.

FIGS. 4A, 4B, 4C, and 4D are schematic diagrams illustrating expansion of an overlap region between divided images due to deformation.

FIG. 9, which is composed of FIGS. 9A and 9B, is a configuration diagram of an imaging apparatus according to a second exemplary embodiment of the invention.

FIG. 14 is a timing chart illustrating an operation sequence of the imaging apparatus.

Figure 2A:
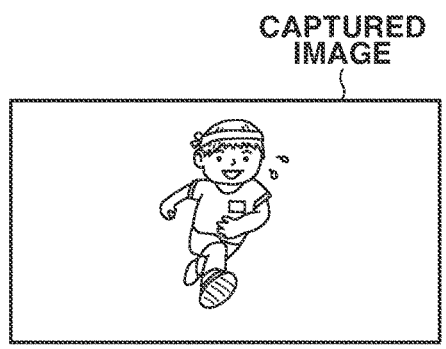
FIGS. 2A, 2B, 2C, and 2D are schematic diagrams illustrating division processing performed on a captured image.

DESCRIPTION OF THE EMBODIMENTS (Block Diagram of Imaging Apparatus)

A configuration (block diagram) of an imaging apparatus serving as an optical apparatus according to a first exemplary embodiment of the invention is described with reference to FIG. 1, which is composed of FIGS. 1A and 1B.

A first image processing processor 100a and a second image processing processor 100b each process input divided image data and output the processed image data.

An operation unit 111 is configured with, for example, recording start/end buttons and a touch panel mounted on the exterior portion of an imaging apparatus body, and transmits an operation performed by the operator to the first image processing processor 100a.

An imaging optical system 120 forms a subject image on the imaging plane of an image sensor 141 via an optical lens group such as a variable magnification optical system 121.

A zoom encoder 131 detects the position of the variable magnification optical system 121 (zoom position), and outputs the zoom position to the first image processing processor 100a.

The image sensor 141 photo-electrically coverts a subject image formed on the imaging plane under the control of the first image processing processor 100a to generate a captured image signal, and outputs image data obtained by analog-to-digital (A/D) converting the captured image signal.

A division unit 142 cuts out respective processing ranges for the first image processing processor 100a and the second image processing processor 100b from image data output from the image sensor 141 under the control of the first image processing processor 100a, and outputs the respective processing ranges to the first image processing processor 100a and the second image processing processor 100b.

An angular velocity sensor 151 detects a motion applied to the imaging apparatus body as an angular velocity signal, and outputs the angular velocity signal to the first image processing processor 100a.

Here, when the optical axis direction is defined as the Z-axis, the vertically upward direction is defined as the Y-axis, and the direction perpendicular to both the Y-axis direction and the Z-axis direction is defined as the X-axis, the angular velocity sensor 151 detects angular shakes in the yaw direction (rotational direction around the Y-axis), the pitch direction (rotational direction around the X-axis), and the roll direction (rotational direction around the Z-axis).

A display device 162 displays image data for displaying output from the second image processing processor 100b.

Image data for recording encoded by the first image processing processor 100a is recorded on a recording medium 171.

Next, a configuration of the inside of the first image processing processor 100a is described.

A control microcomputer 101a, which contains a non-volatile memory and a work memory, controls each block connected via a control bus 102a while temporarily reading and writing data in the work memory based on a program and data stored in the non-volatile memory.

The control microcomputer 101a communicates control information to the second image processing processor 100b via a communication unit 103a.

An image input unit 181a receives image data output from the division unit 142.

A first image memory 182a stores the image data received by the image input unit 181a.

A signal processing unit 104a performs correction processing or development processing on image data stored in the image memory 182a, which is placed in front of the signal processing unit 104a.

A second image memory 105a stores image data processed by the signal processing unit 104a.

An image deformation unit 106a deforms image data by transforming pixel positions of deformed image data into readout positions of image data stored in the image memory 105a based on deformation parameters set by the control microcomputer 101a, and outputs the deformed image data.

A third image memory 183a stores image data output from the image deformation unit 106a.

A coding unit 184a codes image data stored in the image memory 183a according to an instruction for recording start/end from the control microcomputer 101a, and outputs the coded image data.

A data receiving unit 185a receives code data coded by the second image processing processor 100b.

A code memory 186a stores first coded data output from the coding unit 184a and second coded data received by the data receiving unit 185a.

A recording control unit 108a combines the first coded data and the second coded data stored in the code memory 186a according to an instruction for recording start/end from the control microcomputer 101a. Then, the recording control unit 108a records data for recording on the recording medium 171.

A data sending unit 109a sends image data stored in the image memory 183a to the second image processing processor 100b.

An A/D conversion unit 110a digitizes the angular velocity signal output from the angular velocity sensor 151, and outputs the digitized signal as angular velocity data.

An image deformation amount calculation unit 111a calculates the focal length based on an output from the zoom encoder 131. Moreover, the image deformation amount calculation unit 111a calculates a deformation amount occurring in a captured image based on the angular velocity data output from the A/D conversion unit 110a and the calculated focal length, and calculates a deformation parameter used for correction by the image deformation unit 106a.

Next, a configuration of the inside of the second image processing processor 100b is described. The configuration of the second image processing processor 100b is similar to that of the first image processing processor 100a, but the contents of processing performed by some blocks are different in terms of system configurations.

The contents of processing performed by the blocks 181b, 182b, and 101b to 106b are similar to those of the blocks 181a, 182a, and 101a to 106a of the first image processing processor 100a.

A data receiving unit 185b receives second image data from the first image processing processor 100a.

A third image memory 183b pastes the first image data output from the image deformation unit 106b and the second image data received by the data receiving unit 185b in a single piece of image data on memory and stores the resultant image data.

A display processing unit 107b reads out image data stored in the image memory 183b. Then, the display processing unit 107b resizes the image data for displaying, superimposes display information configured with characters or icons on the image data based on an instruction from the control microcomputer 101b, and outputs the image data for displaying to the display device 162.

A coding unit 184b codes a portion, output from the image deformation unit 106b, of image data stored in the image memory 183b according to an instruction for recording start/end from the control microcomputer 101a.

A code memory 186b stores code data output from the coding unit 184b.

A data sending unit 109b sends code data stored in the code memory 186b to the first image processing processor 100a.

Furthermore, the zoom encoder 131 and the angular velocity sensor 151 are not connected to the second image processing processor 100b, and blocks corresponding to the blocks 110a and 111a of the first image processing processor 100a are not used.

Instead, the control microcomputer 101b receives control information such as deformation parameters from the first image processing processor 100a via the communication unit 103b, and controls each block based on the control information.

(Division Processing of Captured Image)

Next, division processing of a captured image is described with reference to FIGS. 2A, 2B, 2C, and 2D.

In the imaging apparatus according to the present exemplary embodiment, a captured image is divided into two divided images at the time of capturing a moving image, and two image processing processors 100a and 100b process the respective divided images.

FIG. 2A illustrates an example of a captured image for one frame captured by the image sensor 141. Here, the resolution of the captured image is supposed to be horizontal 3840×vertical 2160 pixels, and the frame rate of image capturing is supposed to be 60 frames per second (fps).

Furthermore, each of the two image processing processors 100a and 100b used in the imaging apparatus according to the present exemplary embodiment is supposed to have only a little more than half of the processing ability with respect to the frame rate of image capturing.

Therefore, in order to process the captured image at the same frame rate, the processing needs to be distributed to the two image processing processors 100a and 100b.

Figure 2B:
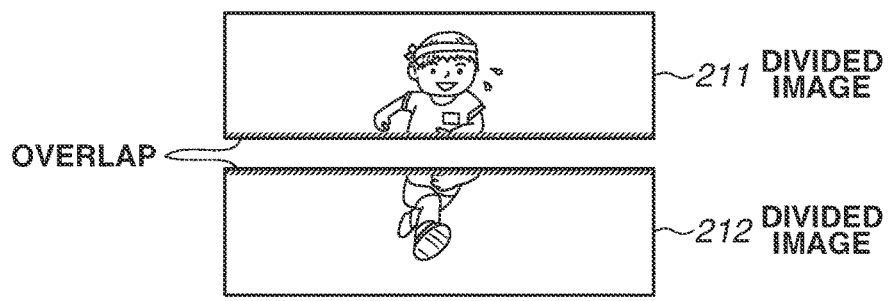

FIG. 2B illustrates a divided image 211 and a divided image 212, which are obtained by the division unit 142 dividing the captured image into an upper portion and a lower portion. In the imaging apparatus according to the present exemplary embodiment, the captured image is divided into an upper portion and a lower portion, which are then input to the image processing processors 100a and 100b, respectively.

Since each image processing processor individually performs signal processing and image deformation, in order to prevent the continuity of an image from being lost at a boundary portion between divided images, each divided image is provided with an overlap region at the adjoining portion.

Figure 2C:
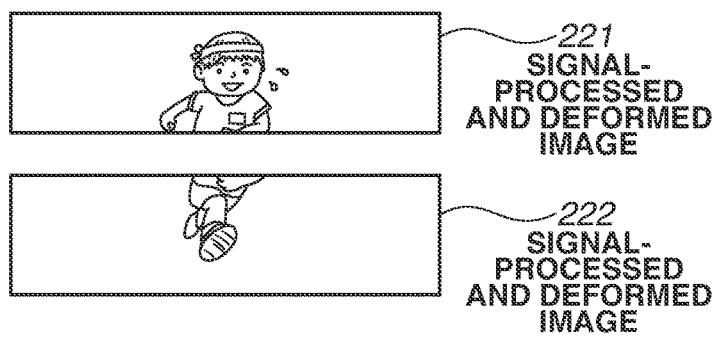

FIG. 2C illustrates signal-processed and deformed images 221 and 222, which are respectively obtained by the image processing processors 100a and 100b performing image processing and image deformation on the divided images 211 and 212.

The respective overlap regions of the divided images 211 and 212 are deleted by image processing performed by the insides of the image processing processors 100a and 100b, and the signal-processed and deformed images 221 and 222 are stored in the image memories without including the overlap regions.

Figure 2D:
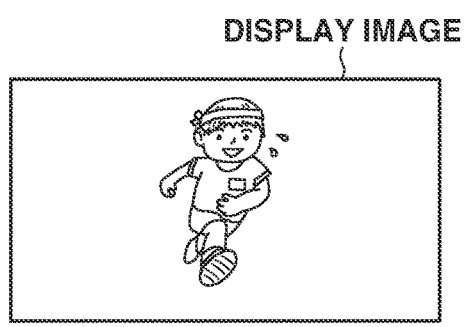

FIG. 2D illustrates an image with a continuity of a boundary portion between divided images kept, which is obtained by the image memory 183b of the second image processing processor 100b pasting the signal-processed and deformed images 221 and 222 to each other.

(Deformed Image Occurring in Captured Image)

Next, deformations occurring in a captured image are described from three viewpoints with reference to FIGS. 3A, 3B, 3C, 3D, 3E, 3F, 3G, 3H, 3I, and 3J.

The first viewpoint is a deformation of the captured image occurring due to an angular shake applied to the imaging apparatus.

The angular shake applied to the imaging apparatus causes a geometric deformation obtained by a combination of components of translations (horizontal and vertical), tilts (horizontal and vertical), rotation, scaling, and shear, as illustrated in FIGS. 3A to 3F to occur in the captured image.

For example, Japanese Patent Application Laid-Open No. 2011-97474 discusses that the deformation component occurring in a captured image due to an angular shake applied to the imaging apparatus is smaller in components of scaling and shear than in the other components.

Therefore, even in the imaging apparatus according to the present exemplary embodiment, translations (horizontal and vertical), tilts (horizontal and vertical), and rotation are set as targets for correction to the angular shake.

The second viewpoint is a distortion aberration occurring by an imaging optical system. The imaging optical system 120 has a distortion aberration which depends on the imaging optical system 120 itself and the position of the variable magnification optical system 121 (zoom position), i.e., the focal length.

Figure 3A:
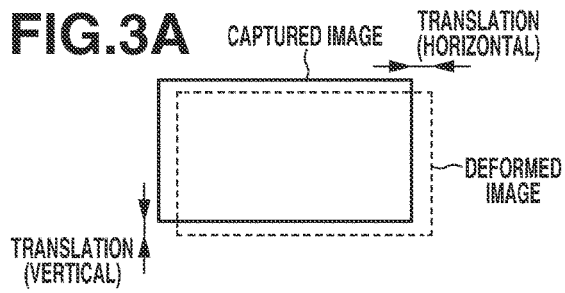
FIGS. 3A, 3B, 3C, 3D, 3E, 3F, 3G, 3H, 3I, and 3J are schematic diagrams illustrating deformations occurring in a captured image.
Figure 3B:
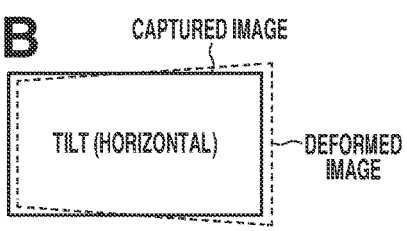
Figure 3C:
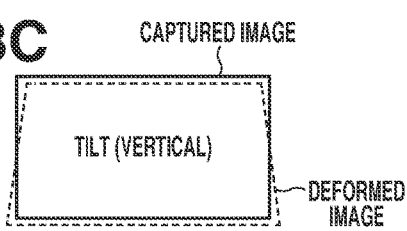
Figure 3D:
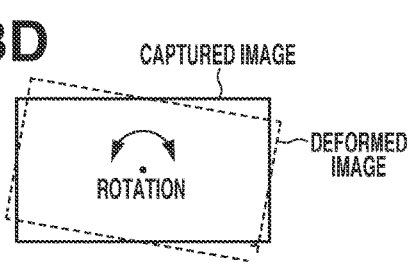
Figure 3E:
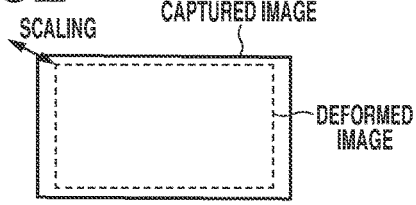
Figure 3F:
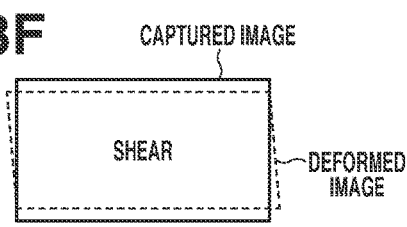
Figure 3G:
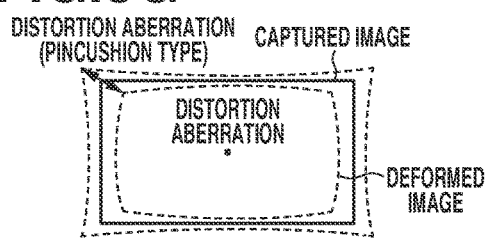

The distortion aberration causes expansion and contraction in the image height direction centering on the center position of the imaging optical system (hereinafter referred to as the "optical center") to occur in a captured image in a radial fashion, so that barrel-type or pincushion-type distortion aberration occurs as illustrated in FIG. 3G.

The third viewpoint is a rolling-shutter distortion (hereinafter referred to as the "RS distortion") which depends on the readout timing of the image sensor 141.

In the case of an imaging apparatus using a complementary metal-oxide semiconductor (CMOS) image sensor, control to read out electric charges accumulated in each line is performed from the upper portion of the CMOS image sensor toward the lower portion thereof.

This readout method is called a rolling shutter (hereinafter referred to as "RS") method, in which the readout timing differs between the upper portion and the lower portion of the image sensor.

This is supposed to cause a shake in the imaging apparatus, so that the position of a subject is moved on the imaging plane.

Figure 3H:
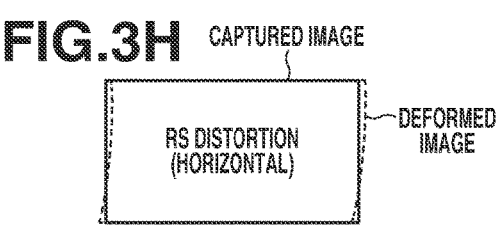
Figure 3I:
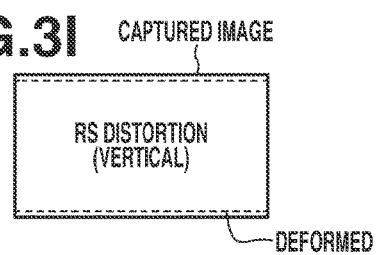
Figure 3J:
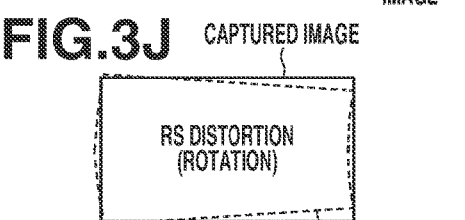

In that case, the difference in readout timing causes RS distortions (horizontal, vertical, and rotation), such as those illustrated in FIGS. 3H, 3I, and 3J, to occur in the captured image.

The RS distortion is composed of a horizontal translation component, a vertical translation component, and a rotation component for each line.

Next, a method in which the image deformation amount calculation unit 111a of the image processing processor 100a calculates deformation parameters used for correcting deformations in the above three viewpoints is described.

With regard to the first viewpoint, the image deformation amount calculation unit 111a detects angular shakes in the yaw, pitch, and roll directions applied to the imaging apparatus based on angular velocity data obtained by A/D converting the output of the angular velocity sensor 151.

Moreover, the image deformation amount calculation unit 111a calculates the focal length of the imaging optical system 120 from the output of the zoom encoder 131.

For example, Japanese Patent Application Laid-Open No. 2011-97474 discusses a method of obtaining translation (horizontal and vertical) components, tilt (horizontal and vertical) components, and a rotation component, which are used for correcting deformations occurring in the captured image, from the angular shakes in the three directions and the focal length.

The image deformation amount calculation unit 111a in the present exemplary embodiment also uses the above-mentioned method to obtain the respective components for correcting deformations occurring in the captured image, and calculates deformation parameters to be set to the image deformation unit 106a.

The image deformation unit 106a corrects the above-mentioned deformation components using projection transform.

Furthermore, in a case where the imaging optical system 120 contains a shift lens, a method similar to the above-mentioned method can also be used to obtain the respective components for correction based on the position of the shift lens.

With regard to the second viewpoint, the image deformation amount calculation unit 111a obtains an expansion or contraction component in the image height direction centering on the optical center for correcting a distortion aberration occurring in the captured image corresponding to the focal length.

For example, Japanese Patent Application Laid-Open No. 2008-259076 discusses a method of obtaining an expansion or contraction component in the image height direction using a polynomial of degree n of the distance from the optical center.

The image deformation amount calculation unit 111a in the present exemplary embodiment also previously stores coefficients of a polynomial of degree n corresponding to the focal length of the imaging optical system 120 in an internal non-volatile memory, and thus obtains an expansion or contraction component corresponding to the focal length.

Furthermore, in a case where the imaging optical system 120 is configured to be interchangeable, coefficient data associated with an individual imaging optical system can be selectively used or coefficient data stored in a non-volatile memory can be rewritten to be used based on a control operation of the control microcomputer 101a.

With regard to the third viewpoint, the image deformation amount calculation unit 111a obtains translation (horizontal and vertical) components and a rotation component for each line for correcting RS distortions occurring in the captured image.

For example, Japanese Patent Application Laid-Open No. 2014-64143 discusses a method of obtaining a correction amount for each of lines located at predetermined intervals based on the transition of the angular velocity data for the readout period of the captured image and the focal length and performing RS distortion correction for all of the lines while performing interpolation.

The image deformation amount calculation unit 111a in the present exemplary embodiment also uses a method similar to the above-mentioned method to obtain translation (horizontal and vertical) components and a rotation component for each line.

Furthermore, in a case where the imaging optical system 120 contains a shift lens, a method similar to the above-mentioned method can also be used to obtain the respective components for correction based on the position of the shift lens, which shifts in directions perpendicular to the optical axis of the imaging optical system 120.

The image deformation amount calculation unit 111a calculates deformation parameters to be set to the image deformation unit 106a in the three viewpoints.

The control microcomputer 101a sets the deformation parameters obtained by the image deformation amount calculation unit 111a to the image deformation unit 106a, and causes the image deformation unit 106a to correct an image stored in the image memory 105a.

In the second image processing processor 100b, the control microcomputer 101b sets the deformation parameters, which are received from the first image processing processor 100a via the communication unit 103b, to the image deformation unit 106b, and causes the image deformation unit 106b to correct an image stored in the image memory 105b.

(Expansion of Overlap Region of Divided Image)

Next, expansion of an overlap region of a divided image due to deformation is described with reference to FIGS. 4A and 4B.

The image deformation units 106a and 106b are supposed to perform deformation of divided images based on the deformation parameters calculated by the image deformation amount calculation unit 111a.

In that case, since the readout position varies even in a boundary portion between the divided images, a large overlap region needs to be included in each of the divided images.

For example, FIG. 4A illustrates, by dashed lines, ranges which the image deformation units 106a and 106b refer to in a case where no deformation occurs in the captured image.

Furthermore, the reason why the range indicated by a dashed line is smaller than the whole captured image is supposed to be that, when an angular shake is applied to the imaging apparatus, a captured image is deformed and the readout position is varied for correction.

At that time, in order for the readout position not to exceed the range of the captured image, a margin for deformation is provided at each of left, right, top, and bottom edge portions.

An overlap region required for each of divided images obtained by dividing the captured image into upper and lower portions illustrated in FIG. 4A only needs to have a minimum size sufficient to prevent the continuity of an image from being lost at a boundary portion between the divided images.

For example, in a case where each of the image deformation units 106a and 106b is configured to internally perform such filter processing as to refer to upper three lines and lower three lines with respect to each line, each of the upper and lower divided images only needs to include an overlap region having three lines.

Furthermore, each of the signal processing units 104a and 104b, which perform image processing in advance of the image deformation units 106a and 106b, are also supposed to internally perform filter processing.

In that case, the division unit 142 performs division processing in such a way as to input divided images including an overlap region also containing the reference range to the respective image processing processors 100a and 100b.

After performing image processing, each of the signal processing units 104a and 104b deletes an overlap region provided for itself.

Then, each of the signal processing units 104a and 104b stores each divided image in each of the image memories 105a and 105b while keeping an overlap region required by each of the image deformation units 106a and 106b.

After performing image processing, each of the image deformation units 106a and 106b deletes an overlap region provided for itself, and outputs the deformed divided image to the recording control unit 108a or the display processing unit 107b.

On the other hand, FIG. 4B illustrates, by dashed lines, ranges which the image deformation units 106a and 106b refer to in a case where a deformation having a rotation component occurs in the captured image.

In FIG. 4B, as compared with FIG. 4A, the reference range which each of the image deformation units 106a and 106b refers to becomes larger in the vertical direction, so that the overlap region expands.

In this way, as the deformation amount of a captured image becomes larger, the overlap region tends to expand. Therefore, it is necessary to estimate an overlap region based on the maximum deformation amount and to determine a range in which to cut out a divided image from the captured image.

However, if the overlap region is simply expanded, the size of a divided image which each of the image processing processors 100a and 100b processes would become large.
(Change of Range of Use of Captured Image)

Next, a change of the range of use of a captured image is described with reference to FIGS. 4C and 4D.

Each of the image processing processors 100a and 100b in the present exemplary embodiment has only a little more than half of the processing ability with respect to the frame rate of image capturing. Therefore, if the overlap region is simply expanded, it becomes difficult to process the captured image at a predetermined frame rate.

Accordingly, the division unit 142 in the present exemplary embodiment is supposed to need to expand the overlap region of the captured image. In that case, the division unit 142 narrows the range of use of the captured image according to that expansion and cuts out a divided image in the narrowed range of use, and the image processing processors 100a and 100b process the respective divided images in that range and perform recording and displaying.

For example, FIG. 4C illustrates a processing range to be processed by the image processing processor 100a and a processing range to be processed by the image processing processor 100b in a case where divided images are cut out with the whole area of the captured image set as the range of use.

Here, since the overlap region is set large as illustrated in FIG. 4B, the processing range to be processed by each image processing processor is large.

If the processing range exceeds a predetermined size, it becomes difficult for the signal processing unit or the image deformation unit of each image processing processor to process an image at a predetermined frame rate.

On the other hand, FIG. 4D illustrates a processing range to be processed by the image processing processor 100a and a processing range to be processed by the image processing processor 100b in a case where divided images are cut out with the range of use of the captured image narrowed.

Even if the overlap region is large, narrowing the range of use by setting the left, right, top, and bottom end portions as a non-processing range enables the signal processing unit or the image deformation unit of each image processing processor to process an image at a predetermined frame rate.
(Operation Modes of Division Processing)

Next, operation modes of the division processing are described with reference to FIG. 5.

The imaging apparatus according to the present exemplary embodiment includes an image stabilization execution mode, which corrects a deformation caused by an angular shake applied to the imaging apparatus and an RS distortion, and an image stabilization non-execution mode, which does not correct those.

The image stabilization execution mode is used when the operator performs image capturing while holding the imaging apparatus with the operator's hand or performs image capturing while walking. The image stabilization execution mode is available for reducing an influence which the motion of the imaging apparatus occurring at that time has on an image to be recorded and displayed.

On the other hand, since the image stabilization execution mode requires a margin region for deformation on a captured image, an angle of view available for recording and displaying is narrowed.

In contrast, the image stabilization non-execution mode, although not being available for reducing an influence of the shake of the imaging apparatus, enables recording and displaying the entire angle of view of a captured image and is suitable for image capturing performed with the imaging apparatus fixed to, for example, a tripod.

Here, the image stabilization non-execution mode is referred to as a "first operation mode", in which only distortion aberration out of deformations occurring in a captured image is corrected.

On the other hand, the image stabilization execution mode is classified into three modes, referred to as "second to fourth operation modes", corresponding to three zones into which the position (zoom position) of the variable magnification optical system 121, i.e., the focal length, is divided from the wide-angle side to the telephoto side.

Out of deformations occurring due to an angular shake applied to the imaging apparatus, translation (horizontal and vertical) components increase in proportion to the focal length, and tilt (horizontal and vertical) components decrease in inverse proportion to the focal length.

Furthermore, the correction amount of distortion aberration also varies depending on the focal length. Moreover, the horizontal and vertical components of the RS distortion also increase in proportion to the focal length.

In particular, since the correction amount of distortion aberration varies in a non-linear way with respect to the focal length, the estimation of the maximum deformation amount obtained by combining these deformations is simplified.

Therefore, the division processing and the correction of deformation corresponding to the range of each focal length are performed in three operation modes corresponding to zones 1, 2, and 3 into which the focal length is divided starting with the wide-angle side.

(Division Processing in First Operation Mode)

Next, division processing performed in the first operation mode is described with reference to FIGS. 6A and 6B.

Figure 6A:
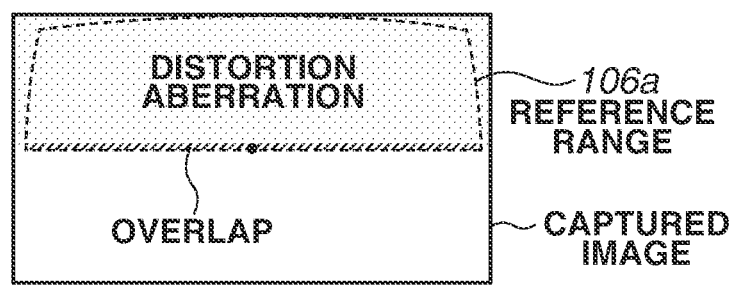
FIGS. 6A and 6B are schematic diagrams illustrating division processing in a first operation mode.

FIG. 6A illustrates, by a dashed line, a range which the image deformation unit 106a of the first image processing processor 100a refers to with respect to a captured image captured at a given focal length in the first operation mode.

In the present exemplary embodiment, the center of the captured image is the optical center, and the division unit 142 divides the captured image into upper and lower portions with a horizontal line passing through the optical center set as a boundary and provides an overlap region at the boundary portion.

On the horizontal line passing through the optical center, the deformation due to distortion aberration varies only in the horizontal direction, and the readout position does not vary in the upward and downward directions.

Although the upper and lower ends of the overlap region are slightly away from the horizontal line, the deformation in the vertical direction is still small, and the variation of the readout position in the upward and downward directions is very small.

For example, as long as the overlap region required for internal processing performed by the image deformation unit 106a has about three lines both in the upward and downward directions from the boundary line, the variation of the upper or lower end of the overlap region in the upward or downward direction is less than one line at a maximum.

Therefore, in the present mode, the overlap region required for the image deformation unit 106a only needs to have four lines by the addition of one line.

Figure 6B:
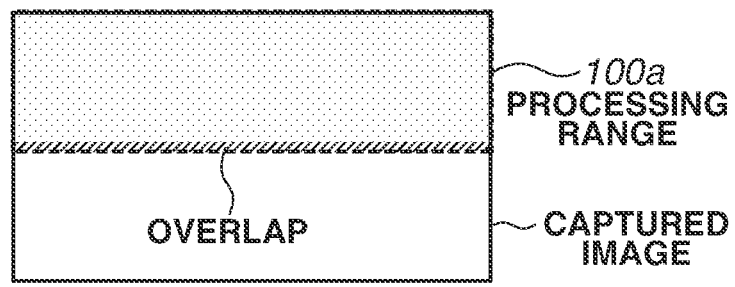

FIG. 6B illustrates, by a dashed line, a range which the division unit 142 cuts out from the captured image and inputs to the image processing processor 100a under the same condition as in FIG. 6A.

The range illustrated in FIG. 6B is a range obtained by adding a number of lines required for internal processing performed by the signal processing unit 104a to the overlap region with respect to the range indicated by a dashed line in FIG. 6A.

For example, if three lines both in the upward and downward directions are required for internal processing performed by the signal processing unit 104a, the overlap region is set to have seven lines in total by the addition to the above four lines.

The image processing processor 100a in the present exemplary embodiment is supposed to have only a little more than half of the processing ability with respect to the frame rate of image capturing, and is thus able to perform processing with the addition of an overlap region having about seven lines to the half angle of view of image capturing.

Furthermore, also with regard to the second image processing processor 100b, the content of processing thereof is similar to that of the image processing processor 100a except that the processing target is a divided image in the lower half portion.

(Division Processing in Second to Fourth Operation Modes)

Next, division processing performed in the second to fourth operation modes is described with reference to FIGS. 7A, 7B, and 7C.

Figure 7A:
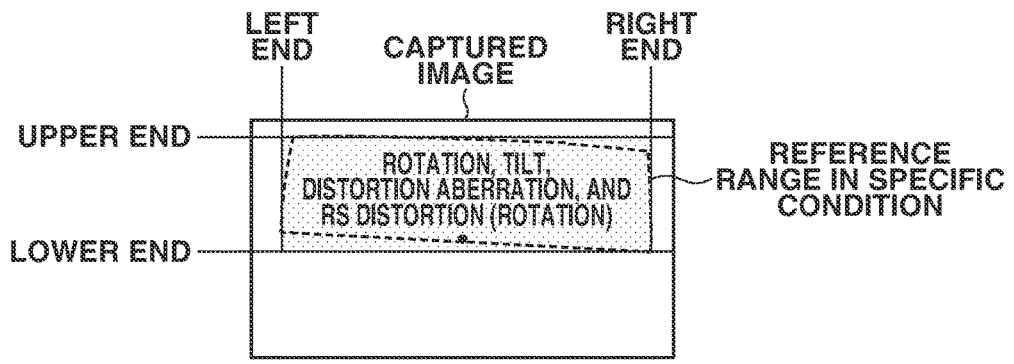
FIGS. 7A, 7B, and 7C are schematic diagrams illustrating division processing in second to fourth operation modes.

FIG. 7A illustrates, by a dashed line, a range which the image deformation unit 106a of the first image processing processor 100a refers to under a specific condition with respect to a captured image captured at a given focal length in the second operation mode.

Here, the specific condition refers to a state in which the image deformation unit 106a has performed, in addition to correction to distortion aberration caused by the focal length, corrections to rotation, tilts (horizontal and vertical), and RS distortion (rotation) to a maximum extent.

With regard to each of rotation, tilts (horizontal and vertical), and RS distortion (rotation), as the correction amount is larger, the variation of the readout position in the horizontal and vertical directions becomes larger.

Out of these deformation components excluding translations (horizontal and vertical) and RS distortions (horizontal and vertical), the correction to distortion aberration is performed by distorting a reference range which the image deformation unit 106a refers to in a curved line, and the corrections to rotation, tilts (horizontal and vertical), and RS distortion (rotation) are performed by obliquely inclining the reference range.

In a case where the correction to rotation or tilts (horizontal and vertical) and the correction to distortion aberration are combined, the reference range sometimes becomes smaller than that in the correction to only rotation or tilts (horizontal and vertical), and the calculation of the above reference range is relatively high in processing load.

For example, Japanese Patent No. 5,432,697 discusses a method in which, when barrel-type distortion aberration is corrected in a combination of the correction to distortion aberration and the correction to rotation, if regions that are not referred to occur at the four corners, a rotation component of the angular shake is corrected by using those regions.

In the imaging apparatus according to the present exemplary embodiment, in the second to fourth operation modes, up to where the reference range expands at a maximum under the specific condition in the range of the focal length assigned to each operation mode is previously calculated to be used.

Figure 7B:
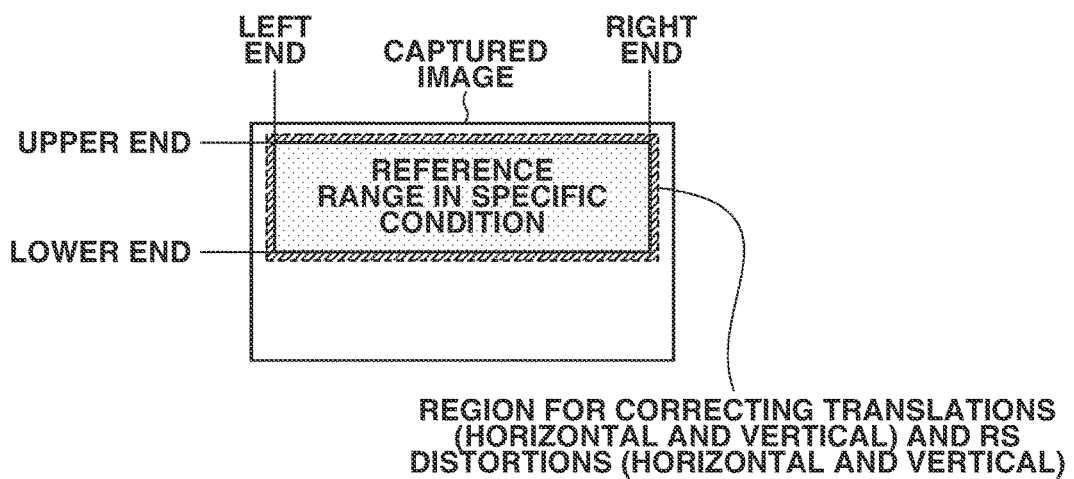

FIG. 7B illustrates, by a dashed line, a divided image which is obtained by additionally providing a region for correction to translations (horizontal and vertical) and RS distortions (horizontal and vertical) of the remaining deformation components to a surrounding area of the above reference range illustrated in FIG. 7A and which is stored in the image memory 105a.

The image deformation unit 106a performs corrections to translations (horizontal and vertical) and RS distortions (horizontal and vertical) in such a range as not to exceed this region.

Furthermore, when corrections to rotation, tilts (horizontal and vertical), and RS distortion (rotation) are performed, an actual reference range may be smaller than the above reference range. In that case, corrections to translations (horizontal and vertical) and RS distortions (horizontal and vertical) can be performed also with use of a remainder of the above reference range.

RS distortion (horizontal), although being a component for distorting the left end and right end of a reference range which the image deformation unit 106a refers to in a curved line, varies only in the horizontal direction from the viewpoint of an individual line. Therefore, RS distortion (horizontal) is not included in deformations used to calculate the reference range illustrated in FIG. 7A, and is used to calculate the correction amount in combination with translation (horizontal).

Figure 7C:
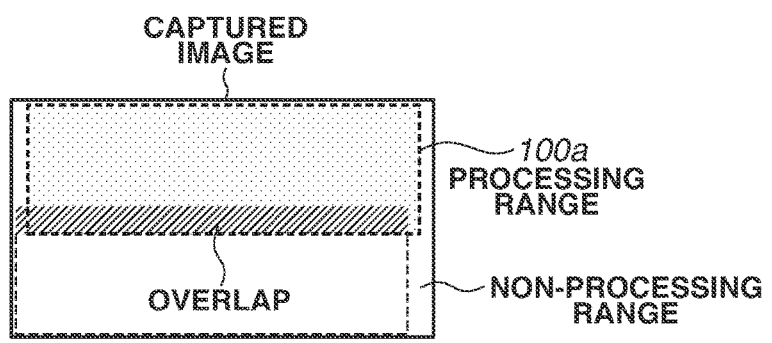

FIG. 7C illustrates, by a dashed line, a processing range of the image processing processor 100a obtained by adding a number of lines required for internal processing performed by the signal processing unit 104a to the overlap region with respect to the divided image stored in the image memory 105a illustrated in FIG. 7B.

As compared with the first operation mode illustrated in FIG. 6B, since the readout position varies in the upward and downward directions even at the boundary portion, the overlap region is expanded.

However, the entire range indicated by a dashed line in FIG. 7C needs to be of a size that is able to be processed within a predetermined time with the processing ability of the image processing processor 100a.

In the imaging apparatus according to the present exemplary embodiment, when performing deformation of a captured image, the image deformation unit 106a additionally performs expansion at a predetermined expansion rate, so that the reference range is narrowed in the horizontal and vertical directions in such a manner that the processing range to be processed by the image processing processor 100a falls within the processing ability thereof.

A non-processing range, which is other than the processing range to be processed by the image processing processor 100a, indicated by a dashed line, and a processing range to be processed by another image processing processor, indicated by a dashed line, is discarded by the division unit 142.

Furthermore, with regard to the second image processing processor 100b, the content of processing thereof is similar to that of the first image processing processor 100a except that the processing target is a divided image in the lower half portion.

In the division unit 102, the amount of overlap between a plurality of divided images in a case where the deformation amount in the image deformation processing is greater than a predetermined value is set larger than the amount of overlap between a plurality of divided images in a case where the deformation amount in the image deformation processing is less than the predetermined value.

In the division unit 102, the amount of overlap between a plurality of divided images is changed according to the focal length of the imaging optical system 120.

In the division unit 102, the amount of overlap between a plurality of divided images in a case where the focal length is greater than a predetermined value is set smaller than the amount of overlap between a plurality of divided images in a case where the focal length is less than the predetermined value.

In the division unit 102, the size of the cutting range of a divided image is changed according to an image size that is able to be processed by an image processing unit per unit time.

In the division unit 102, one frame image is divided into at least two divided images in at least one of the horizontal direction and the vertical direction.

The image deformation processing is configured with at least one of projection transform correction, distortion aberration correction, rolling-shutter distortion correction, and cylindrical conversion correction.

Then, with respect to a boundary portion between a plurality of divided images, the maximum amount of movement of pixel positions due to the image deformation processing is calculated and the amount of overlap is calculated.

(Expansion Rate in Each Operation Mode)

The expansion rate in each operation mode is described with reference to FIGS. 8A and 8B.

Figure 8A:
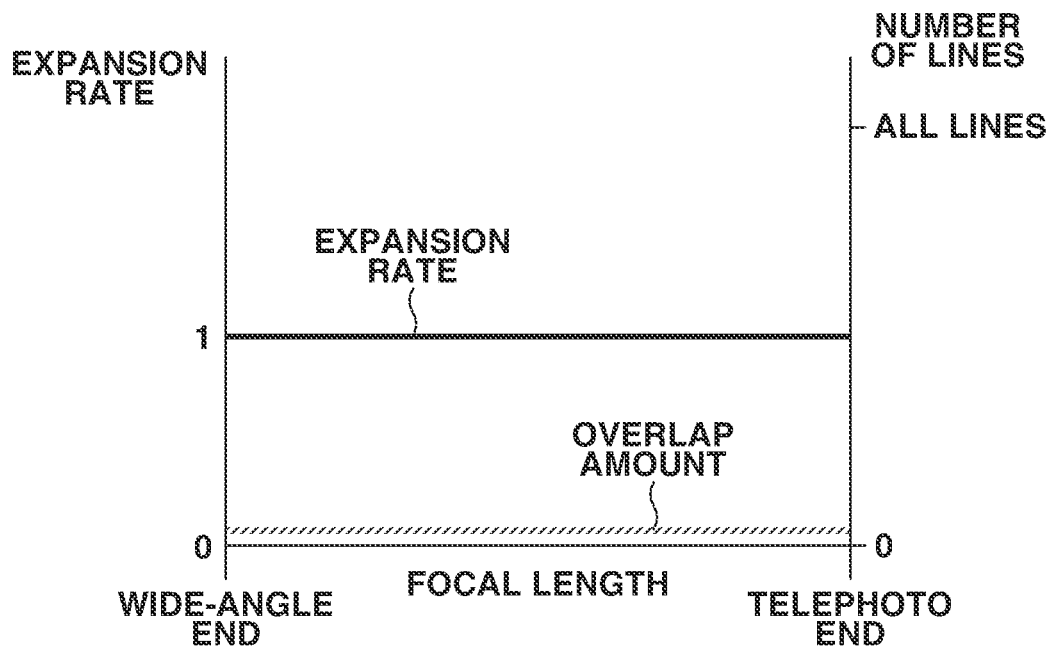
FIGS. 8A and 8B graphs illustrating expansion factors in the operation modes.

FIG. 8A illustrates the expansion rate associated with the focal length and the number of lines of an overlap region included in a divided image which the image processing processor 100a processes in the first operation mode.

In the present operation mode, the number of lines of an overlap region is fixed irrespective of the focal length. Therefore, the processing range to be processed by the image processing processor 100a does not need to be varied, and the expansion rate is also fixed irrespective of the focal length.

Figure 8B:
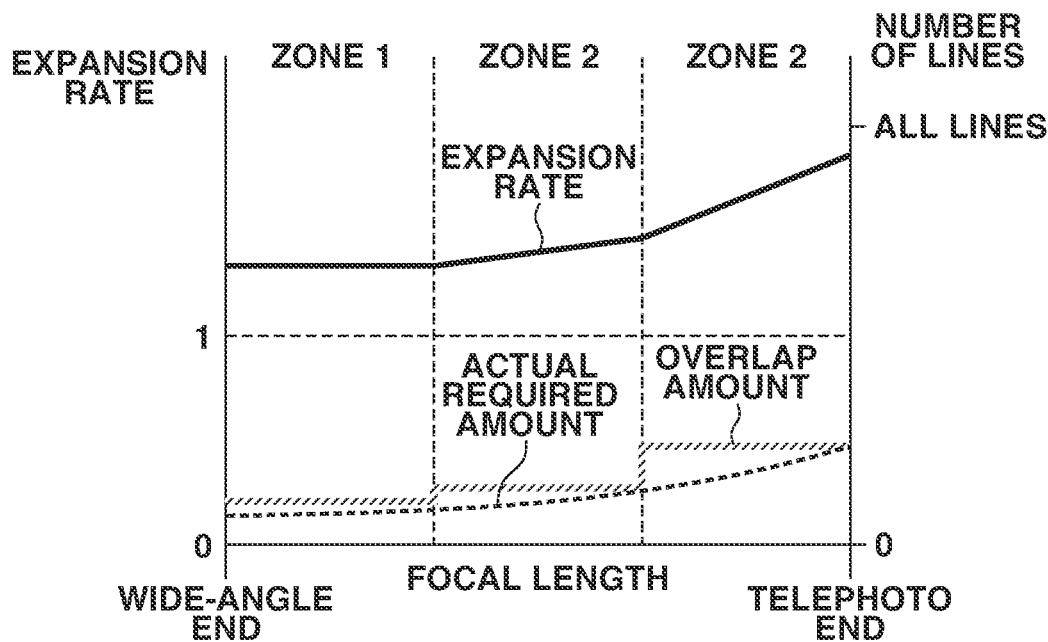

FIG. 8B illustrates the expansion rate associated with the focal length and the number of lines of an overlap region included in a divided image which the image processing processor 100a processes in the second to fourth operation modes.

As mentioned above, the ranges of the focal length corresponding to the zone 1 to the zone 3 are assigned to the respective operation modes.

In any one of the modes, the number of lines of an overlap region is larger than that in the first operation mode illustrated in FIG. 8A, and, in the mode in which the focal length is closer to the telephoto end, the number of lines becomes larger in a stepwise fashion.

With this, the width of variation of the readout position due to corrections to translations (horizontal and vertical) and RS distortions (horizontal and vertical) proportional to the focal length becomes larger than that in the case of the other components.

Therefore, the number of lines of an overlap region actually required, indicated by a dashed line in FIG. 8B, increases in a continuous fashion according to the focal length.

The overlap region in each operation mode is determined in such a way as not to fall below the actually required overlap region.

Since, according to the mode in which the focal length is closer to the telephoto end, the number of lines of an overlap region increases, the processing range to be processed by the image processing processor 100a needs to be narrowed.

Therefore, as indicated by the expansion rate illustrated in FIG. 8B, according to the mode in which the focal length is closer to the telephoto end, the expansion rate is increased in a linear fashion depending on the focal length.

The variation of the expansion rate is controlled in conjunction with the variation of the focal length performed by the variable magnification optical system 121, and is thus performed without providing a feeling of strangeness to the operator.

Furthermore, with regard to the image processing processor 100b, the content of processing thereof is similar to that of the image processing processor 100a.

Next, an operation sequence of the imaging apparatus according to the present exemplary embodiment is described with reference to the timing chart of FIG. 14.

The uppermost pulse signal is an imaging vertical synchronization signal, which is distributed so as to enable the image sensor and each image processing processor to continuously process image data on a frame-by-frame basis in synchronization with each other.

However, in FIG. 1, an originating source and a distribution pathway of the imaging vertical synchronization signal are omitted from the illustration. Here, a pulse denoted by "A" is a synchronization signal for image capturing of a certain frame A. The following description is made based on the frame A.

The second pulse signal from the top is a vertical blanking interrupt, which is used to transmit, to the control microcomputer 101a, information about the timing at which a pause period of readout of image data from the image sensor 141 is started.

However, in FIG. 1, an originating source and a distribution pathway of the vertical blanking interrupt are also omitted from the illustration.

The next row indicates driving timing of the image sensor 141.

The upper end of a parallelogram zone corresponds to a head line of the image sensor 141, the lower end thereof corresponds to an end line of the image sensor 141, the left side thereof indicates charge accumulation start timing of each line, and the right side thereof indicates readout timing of each line.

The charge accumulation start of the head line of the frame A is performed after waiting of charge accumulation start timing received based on an instruction from the control microcomputer 101a after the previous imaging vertical synchronization signal, and the readout of the head line is performed in synchronization with the imaging vertical synchronization signal for the frame A.

A gray dashed line situated midway between the left side and the right side indicates the center on the time axis of the charge accumulation period of each line.

The acquisition of angular data by the image deformation amount calculation unit 111a, which is described below, is performed in synchronization with the center on the time axis of the charge accumulation period of each line.

The next row indicates timing at which the division unit 142 cuts out a processing range for each image processing processor.

The upper line indicates timing at which image data is being sent to the first image processing processor 100a, and "Au" marked in this line means an upper half of the frame A.

The lower line indicates timing at which image data is being sent to the second image processing processor 100b, and "Al" marked in this line means a lower half of the frame A.

Furthermore, a light gray rectangle indicates timing at which the non-processing range is being discarded, and a dark gray rectangle indicates timing at which an overlap region is being sent to both of the image processing processors.

The range of the subsequent first dashed-line rectangle corresponds to processing performed by the first image processing processor 100a.

The first row in that range indicates timing at which the image input unit 181a processes an upper half of each frame. The processing timing at Au (the upper half of the frame A) is coincident with the timing at Au of the division unit 142.

The next row indicates timing at which the signal processing unit 104a of the first image processing processor 100a processes an upper half of each frame.

The signal processing unit 104a starts processing at the same time that the image input unit 181a begins to store image data in the first image memory 182a, but, since the signal processing unit 104a is low in processing speed, approximately a double processing time is required.

The next row indicates angular data acquisition timing and deformation amount calculation timing of the image deformation amount calculation unit 111a.

The upper line indicates, by vertical line segments, a period for acquiring angular data for each frame and timing at which the acquisition of angular data is performed a plurality of times (in FIG. 14, 11 times per frame at regular intervals) within the period.

The acquisition period for each frame is synchronized with the center on the time axis of the charge accumulation period of each line of the image sensor 141.

As soon as the acquisition of angular data for each frame is completed, the deformation amount calculation is started.

Since the time required for the deformation amount calculation becomes a bottleneck against the entire video delay amount as, in particular, the accumulation time of the image sensor 141 is shorter and the acquisition of angular data comes closer to the end of readout of captured image data, processing is performed in such a way as to fulfill an intended video delay amount in the shortest amount of accumulation time.

The next row indicates timing at which the image deformation unit 106a processes an upper half of each frame.

After the deformation amount calculation by the image deformation amount calculation unit 111a is completed, processing is started after a very slight overhead (not illustrated) of the control microcomputer 101a. The time required for the processing is approximately the same as that in the signal processing unit 104a.

The next row indicates timing at which the data sending unit 109a sends, to the second image processing processor 100b, image data of the upper half of each frame stored in the third image memory 183a. Transfer is performed in parallel with the processing performed by the image deformation unit 106a.

The range of the subsequent second dashed-line rectangle corresponds to processing performed by the second image processing processor 100b.

With regard to the image input unit 181b in the first row and the signal processing unit 104b in the next row, the contents of processing thereof are similar to those of the image input unit 181a and the signal processing unit 104a of the first image processing processor 100a except that the processing target is a lower half of each frame.

The next row indicates timing at which the communication unit 103b receives the image deformation amount of each frame calculated by the image deformation amount calculation unit 111a from the communication unit 103a of the first image processing processor 100a.

After the deformation amount calculation is completed, communication is started after a very slight overhead (not illustrated) of the control microcomputer 101*a*. The time required for the communication is very short as illustrated in FIG. 14.

The next row indicates timing at which the image deformation unit 106*b* processes a lower half of each frame. After communication by the communication unit 103*b* is completed, processing is started.

The next row indicates timing at which the data receiving unit 185*b* receives image data of the upper half of each frame from the first image processing processor 100*a* and stores the received image data in the third image memory 183*b*.

The next row indicates timing at which the display processing unit 107*b* outputs each frame to the display device 162.

The third image memory 183*b* pastes the upper half and the lower half to each other to form one frame, and the display processing unit 107*b* reads out and outputs each frame.

The operation timing is started in synchronization with a displaying vertical synchronization signal, which is illustrated below.

However, the vertical synchronization signal is set as follows in a case where the accumulation time of the image sensor 141 is set to the shortest amount of time.

In that case, the timing at which the display processing unit 107*b* finishes reading out the upper half of each frame is set in such a way as not to overtake the timing at which the data receiving unit 185*b* finishes receiving the upper half of each frame.

In FIG. 14, the breadth of an oblique dashed line drawn between the processing by the data receiving unit 185*b* and the processing by the display processing unit 107*b* indicates a margin for preventing overtaking.

A pulse signal illustrated below is the above-mentioned displaying vertical synchronization signal, and the next row indicates timing at which the display device 162 displays each frame.

As illustrated in FIG. 14, a difference between the imaging vertical synchronization signal and the displaying vertical synchronization signal with respect to the frame A serves as a video delay amount for displaying.

Figure 15:
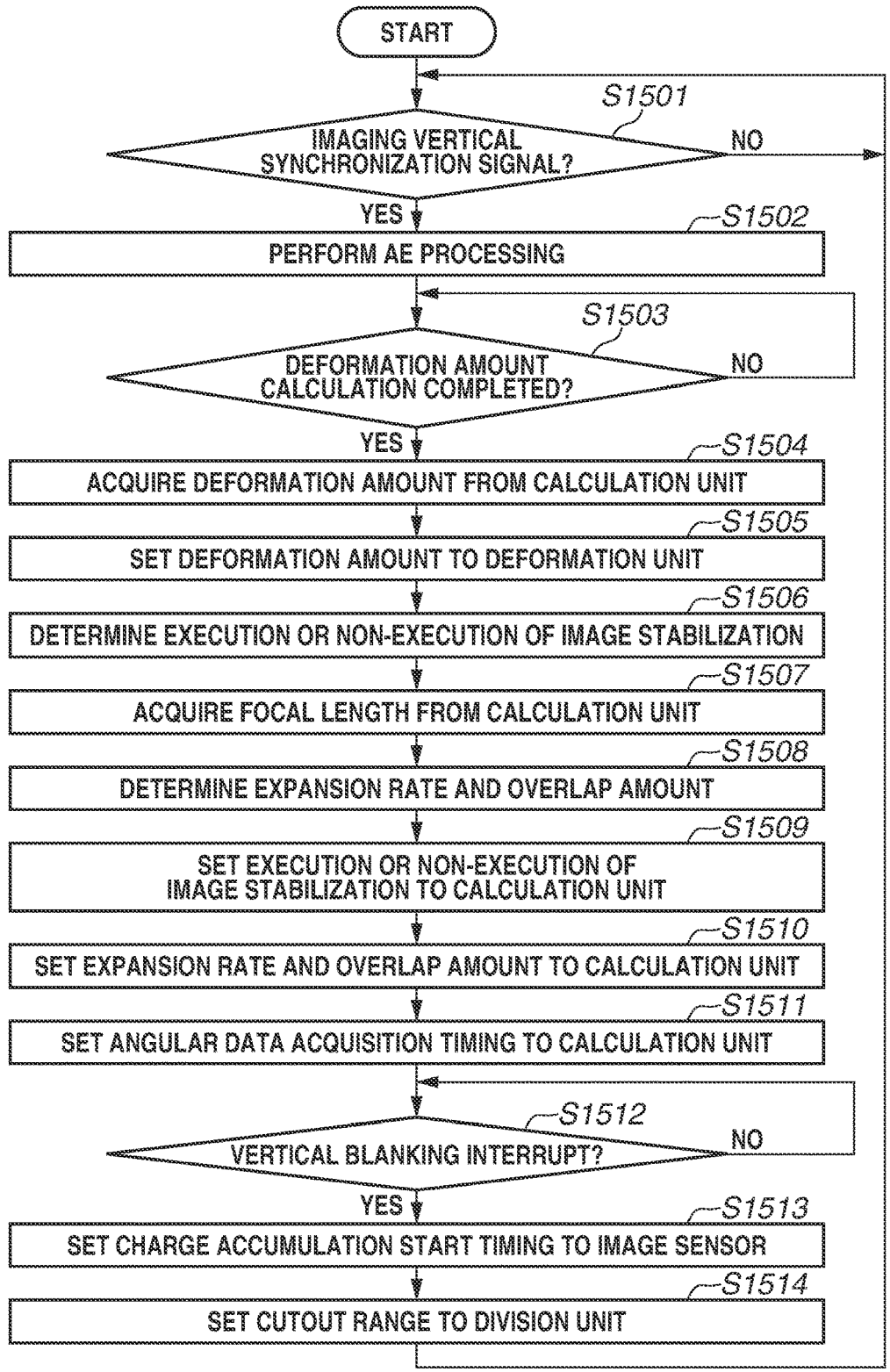
FIG. 15 is a flowchart illustrating the content of processing performed by a control microcomputer.

Next, the content of processing performed by the control microcomputer 101*a* when the image processing processor 100*a* processes deformation with respect to image data on a frame-by-frame basis is described with reference to the flowchart of FIG. 15.

In step S1501, the control microcomputer 101*a* waits for the imaging vertical synchronization signal to arrive.

In step S1502, the control microcomputer 101*a* performs automatic exposure (AE) processing for determining an accumulation time of the image sensor 141 by performing exposure evaluation based on a result of processing performed on image data by the signal processing unit 104*a*.

In step S1503, the control microcomputer 101*a* waits for a notification of the completion of deformation amount calculation from the image deformation amount calculation unit 111*a*.

In step S1504, the control microcomputer 101*a* acquires an image deformation amount from the image deformation amount calculation unit 111*a*.

In step S1505, the control microcomputer 101*a* sets the image deformation amount to the image deformation unit 106*a*.

In step S1506, the control microcomputer 101*a* determines the execution or non-execution of image stabilization based on, for example, the content of an input to the operation unit 111.

In step S1507, the control microcomputer 101*a* acquires the focal length from the image deformation amount calculation unit 111*a*.

Figure 5:
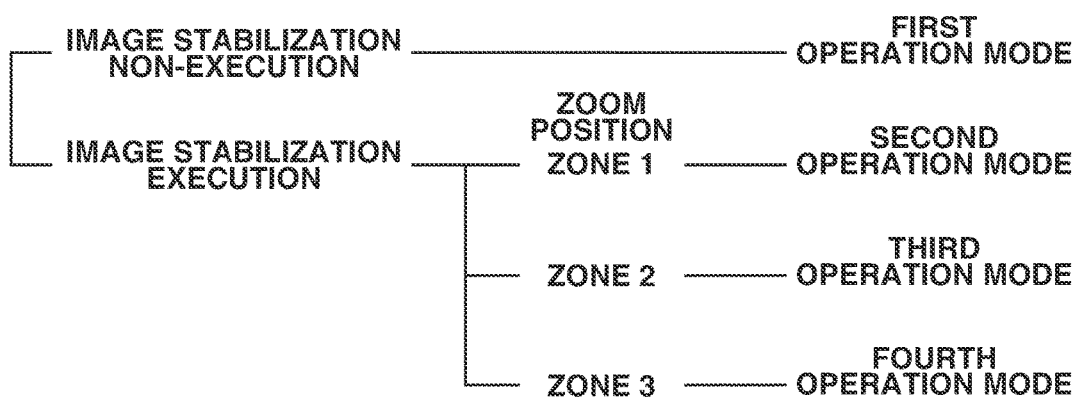
FIG. 5 is a tree diagram illustrating operation modes of division processing.

In step S1508, the control microcomputer 101*a* determines the expansion rate and the overlap amount based on the operation modes illustrated in FIG. 5 and the graphs illustrated in FIGS. 8A and 8B.

In step S1509, the control microcomputer 101*a* sets the execution or non-execution of image stabilization to the image deformation amount calculation unit 111*a*.

In step S1510, the control microcomputer 101*a* sets the determined expansion rate and overlap amount to the image deformation amount calculation unit 111*a*.

In step S1511, the control microcomputer 101*a* sets angular data acquisition timing to the image deformation amount calculation unit 111*a* based on a result of the AE processing.

In step S1512, the control microcomputer 101*a* waits for a vertical blanking interrupt to arrive.

In step S1513, the control microcomputer 101*a* sets charge accumulation start timing to the image sensor 141 based on a result of the AE processing.

In step S1514, the control microcomputer 101*a* sets a cutout position associated with the processing range of each image processing processor to the division unit 142 based on the determined expansion rate and overlap amount, and then returns to step S1501.

Next, the contents of processing which the image deformation amount calculation unit 111*a* performs to calculate the deformation amount for each frame of image data are described with reference to the flowcharts of FIGS. 16A and 16B.

Figure 16A:
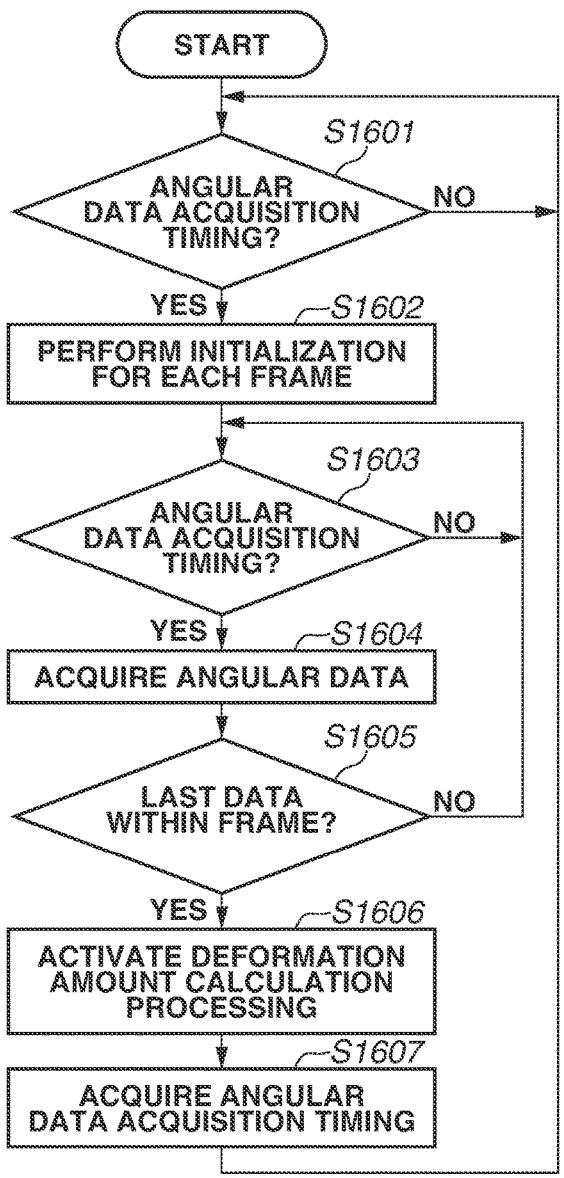
FIGS. 16A and 16B are flowcharts illustrating the content of processing performed by an image deformation amount calculation unit.
Figure 16B:
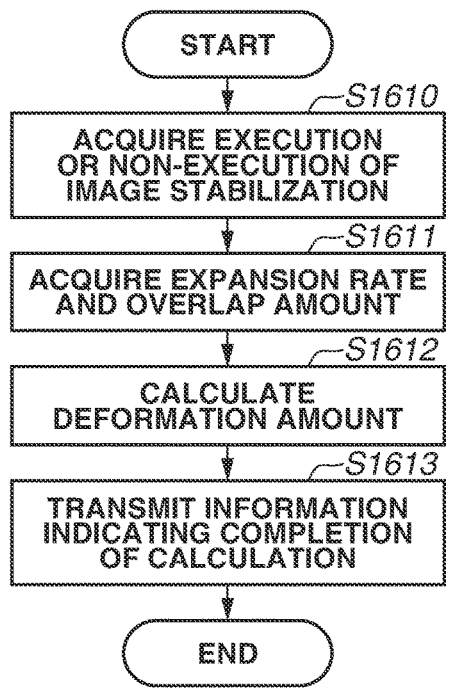

The image deformation amount calculation unit 111*a* performs the contents of processing illustrated in FIGS. 16A and 16B in parallel using a control method such as multitasking.

FIG. 16A is a flowchart for performing processing for acquiring angular data.

In step S1601, the image deformation amount calculation unit 111*a* waits for the angular data acquisition timing set by the control microcomputer 101*a*.

In step S1602, the image deformation amount calculation unit 111*a* performs initialization for each frame. More specifically, the image deformation amount calculation unit 111*a* performs, for example, resetting of an integrated value of angular velocity data acquired from the angular velocity sensor 151, initialization of an internal counter, and discarding of unnecessary data.

In step S1603, the image deformation amount calculation unit 111*a* waits for the angular data acquisition timing set by the control microcomputer 101*a*.

In step S1604, the image deformation amount calculation unit 111*a* acquires angular data from an integrated value of angular velocity data acquired from the angular velocity sensor 151.

In step S1605, the image deformation amount calculation unit 111*a* determines whether the angular data acquired in step S1604 is the last data within a frame. If the angular data is not the last data (NO in step S1605), the image deformation amount calculation unit 111*a* advances an internal counter thereof to return to step S1603, thus waiting for the next angular data acquisition timing.

In step S1606, the image deformation amount calculation unit 111a activates the deformation amount calculation processing illustrated in FIG. 16B and performs the deformation amount calculation processing in parallel with the processing in the present flowchart.

In step S1607, the image deformation amount calculation unit 111a acquires the angular data acquisition timing set by the control microcomputer 101a, and then returns to step S1601, thus using the acquired angular data acquisition timing for processing for the next frame.

FIG. 16B is a flowchart illustrating the content of the deformation amount calculation processing, which is activated in step S1606 in FIG. 16A.

In step S1610, the image deformation amount calculation unit 111a acquires the execution or non-execution of image stabilization set by the control microcomputer 101a.

In step S1611, the image deformation amount calculation unit 111a acquires the expansion rate and the overlap amount set by the control microcomputer 101a.

In step S1612, the image deformation amount calculation unit 111a calculates a deformation amount from, for example, the acquired execution or non-execution of image stabilization, expansion rate, and overlap amount, the angular data acquired in the processing illustrated in FIG. 16A, and the focal length.

In step S1613, the image deformation amount calculation unit 111a transmits, to the control microcomputer 101a, information indicating that the calculation of the deformation amount is completed, and then ends the processing.

The imaging apparatus according to the present exemplary embodiment, when dividing an input image and performing processing with a plurality of image processing processors, is able to correct a shake occurring in a captured image due to movement of the imaging apparatus with a minimum video delay amount within the range of a predetermined image processing ability.

Next, a second exemplary embodiment of the invention is described. An imaging apparatus according to the present exemplary embodiment differs from that of the first exemplary embodiment in that a captured image is divided into not only upper and lower portions but also right and left portions and is then processed by four image processing processors.

With regard to a configuration of the imaging apparatus according to the second exemplary embodiment, portions different from those of the imaging apparatus of the first exemplary embodiment illustrated in FIG. 1 are described with reference to FIG. 9, which is composed of FIGS. 9A and 9B.

(Block Diagram of Imaging Apparatus)

Each of a third image processing processor 100c and a fourth image processing processor 100d processes image data input as a divided image in a similar manner to that in the second image processing processor 100b and then outputs the processed image data.

The division unit 142 cuts out the respective processing ranges for the four image processing processors 100a to 100d from image data output from the image sensor 141 and then outputs the cut-out processing ranges.

The image memory 183b pastes and combines four pieces of image data for displaying output from the four image processing processors 100a to 100d to each other.

In the first image processing processor 100a, the control microcomputer 101a communicates control information with the second to fourth image processing processors 100b to 100d via the communication unit 103a.

Furthermore, the data receiving unit 185a receives three pieces of image data for recording coded by the second to fourth image processing processors 100b to 100d and then outputs the received pieces of image data to the code memory 186a.

The internal configuration of each of the third image processing processor 100c and the fourth image processing processor 100d and the processing content of each block thereof are similar to those of the second image processing processor 100b.

Therefore, in FIG. 9, portions other than the image deformation units 106c and 106d, which are used in the following description, are omitted from the illustration.

(Division Processing of Captured Image)

Next, division processing of a captured image is described with reference to FIGS. 10A, 10B, 10C, and 10D.

In the imaging apparatus according to the present exemplary embodiment, a captured image is divided into four divided images at the time of capturing a moving image, and the respective divided images are then processed by four image processing processors 100a to 100d.

Figure 10A:
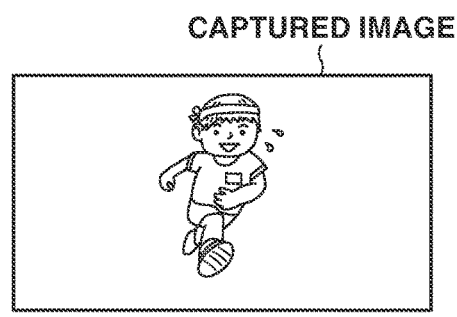
FIGS. 10A, 10B, 10C, and 10D are schematic diagrams illustrating division processing performed on a captured image in the second exemplary embodiment.

FIG. 10A illustrates an example of a captured image for one frame captured by the image sensor 141.

Here, the resolution of the captured image is supposed to be horizontal 3840×vertical 2160 pixels, and the frame rate of image capturing is supposed to be 120 fps.

Furthermore, each of the four image processing processors 100a to 100d used in the imaging apparatus according to the present exemplary embodiment is supposed to have only a little more than one fourth of the processing ability with respect to the frame rate of image capturing.

Therefore, in order to process the captured image at the same frame rate, the processing needs to be distributed to the four image processing processors 100a to 100d.

Figure 10B:
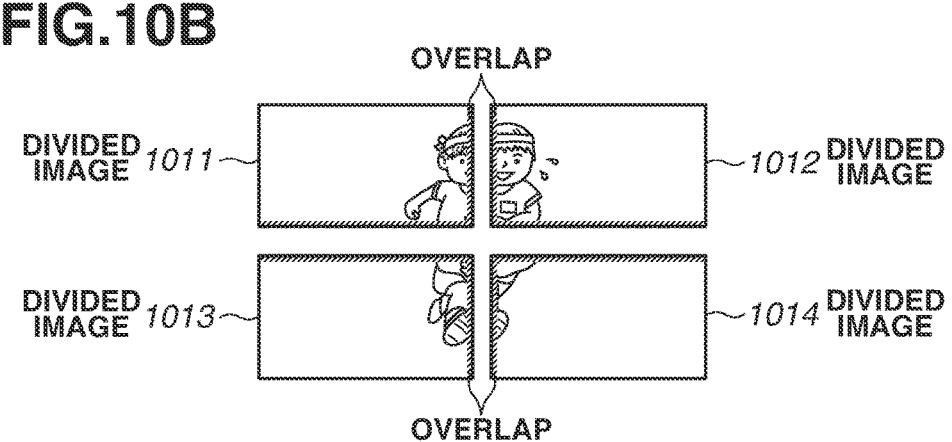

FIG. 10B illustrates an upper left divided image 1011, an upper right divided image 1012, a lower left divided image 1013, and a lower right divided image 1014, which are obtained by the division unit 142 dividing the captured image into upper, lower, right, and left portions.

In the imaging apparatus according to the present exemplary embodiment, the captured image is divided into upper left, upper right, lower left, and lower right portions, which are then input to the image processing processors 100a to 100d, respectively.

Since each image processing processor individually performs signal processing, in order to prevent the continuity of an image from being lost at a boundary portion between divided images, each divided image is provided with an overlap region at the adjoining portion.

Figure 10C:
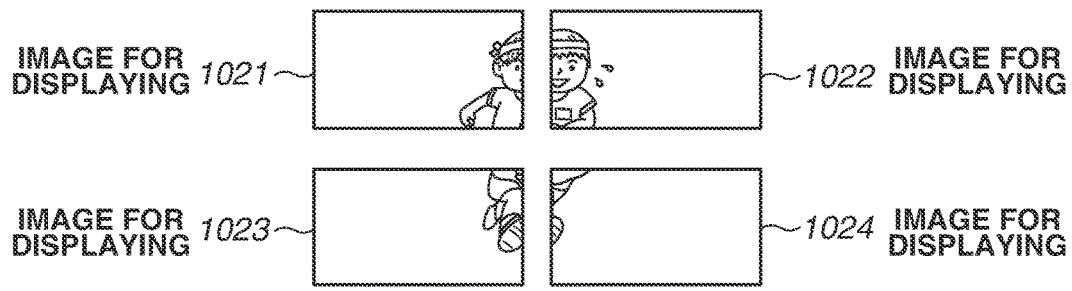

FIG. 10C illustrates images for displaying 1021 to 1024, which are respectively obtained and output by the image processing processors 100a to 100d processing the divided images 1011 to 1014.

The respective overlap regions of the divided images 1011 to 1014 are deleted by image processing performed by the insides of the image processing processors 100a to 100d, and the images for displaying 1021 to 1024 are output without including the overlap regions.

Figure 10D:
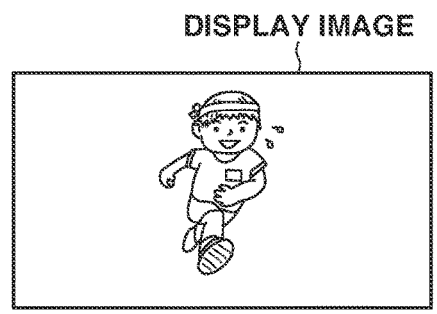

FIG. 10D illustrates a display image displayed on the display device 162 with a continuity of a boundary portion between divided images kept, which is obtained by the image memory 183b combining the four images for displaying 1021 to 1024.

Next, the expansion of an overlap region between divided images due to deformation and the narrowing of the angle of view to be processed are described with reference to FIGS. 11A and 11B.

Figure 11A:
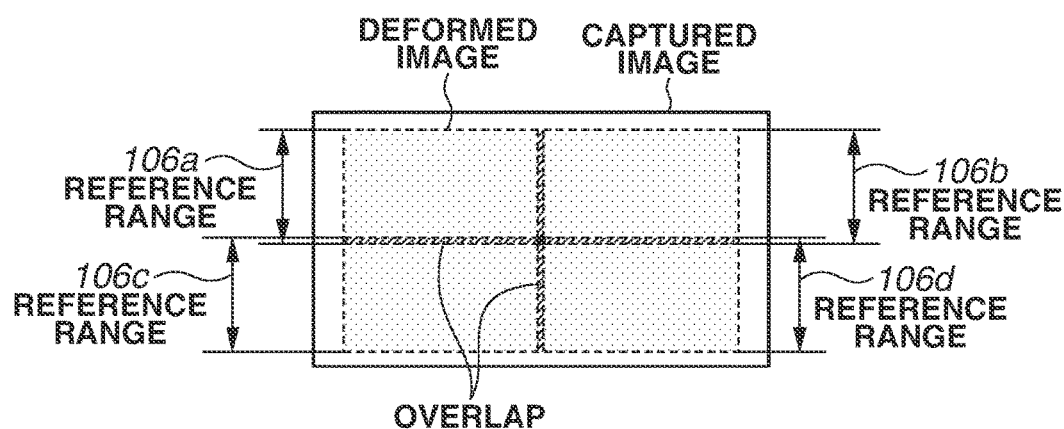
FIGS. 11A and 11B are schematic diagrams illustrating expansion of an overlap region between divided images due to deformation in the second exemplary embodiment.

For example, FIG. 11A illustrates, by dashed lines, ranges which the image deformation units 106a to 106d refer to in a case where no deformation occurs in the captured image.

As with FIGS. 4A to 4D in the first exemplary embodiment, a margin region is provided in a marginal portion of the captured image so as to correct a deformation of the captured image caused by an angular shake.

Furthermore, as described in the first exemplary embodiment, an overlap region required for each of divided images in any one of the horizontal direction and vertical direction only needs to have a minimum size sufficient to prevent the continuity of an image from being lost at a boundary portion between the divided images.

Figure 11B:
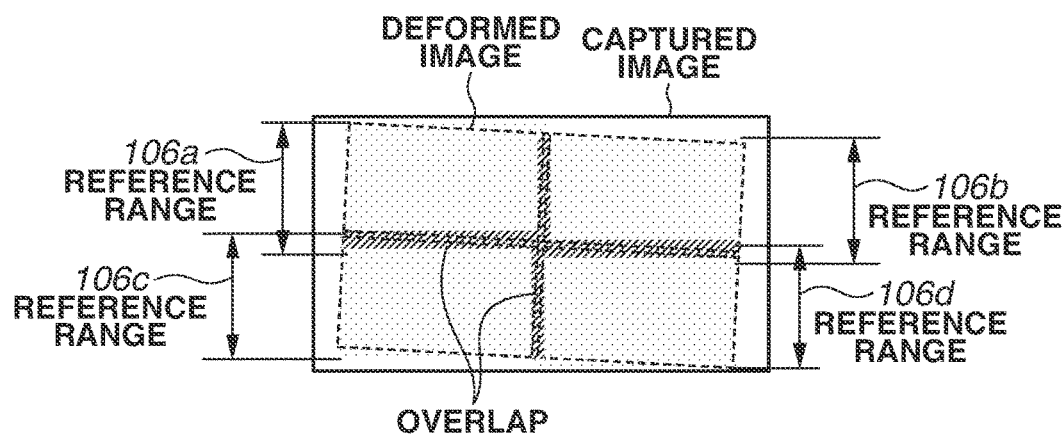

On the other hand, FIG. 11B illustrates, by dashed lines, ranges which the image deformation units 106a to 106d refer to in a case where a deformation having a rotation component occurs in the captured image.

In FIG. 11B, as compared with FIG. 11A, the reference range which each of the image deformation units 106a to 106d refers to becomes larger in the horizontal direction and the vertical direction, so that the overlap region expands.

In the present exemplary embodiment, since an image is divided also in the horizontal direction, with respect to not only the vertical direction but also the horizontal direction, it is necessary to estimate an overlap region based on the maximum deformation amount and to determine a range in which to cut out a divided image from the captured image.
(Division Processing in First Operation Mode)

Next, division processing performed in the first operation mode is described with reference to FIGS. 12A and 12B. As with the first exemplary embodiment, also in the present exemplary embodiment, only distortion aberration out of deformations occurring in a captured image is corrected in the first operation mode.

Figure 12A:
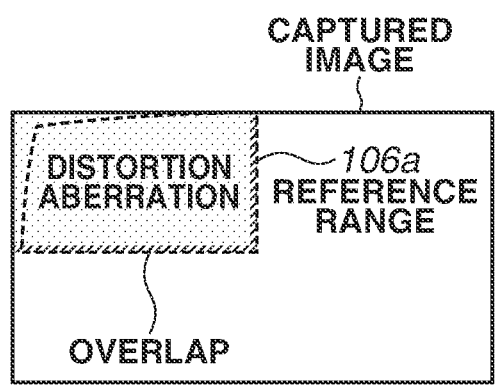
FIGS. 12A and 12B are schematic diagrams illustrating division processing in a first operation mode in the second exemplary embodiment.

FIG. 12A illustrates, by a dashed line, a range which the image deformation unit 106a of the first image processing processor 100a refers to with respect to a captured image captured at a given focal length in the first operation mode.

In the present exemplary embodiment, the center of the captured image is the optical center, and the division unit 142 divides the captured image into upper and lower portions and right and left portions with a horizontal line and a vertical line passing through the optical center set as boundaries and provides an overlap region at each of the boundary portions.

The concept of an overlap region for division into upper and lower portions is similar to that described in the first exemplary embodiment. Also with regard to an overlap region for division into right and left portions, on the vertical line passing through the optical center, the deformation due to distortion aberration varies only in the vertical direction, and the readout position does not vary in the rightward and leftward directions.

Furthermore, although the right and left ends of the overlap region for division into right and left portions are slightly away from the vertical line, the deformation in the horizontal direction is still small, and the variation of the readout position in the rightward and leftward directions is very small.

For example, as long as the overlap region required for internal processing performed by the image deformation unit 106a has about three pixels both in the rightward and leftward directions from the boundary line, the variation of the right or left end of the overlap region in the rightward or leftward direction is less than one pixel at a maximum.

Therefore, in the present mode, the overlap region required for division into right and left portions by the image deformation unit 106a only needs to have four pixels by the addition of one pixel.

Figure 12B:
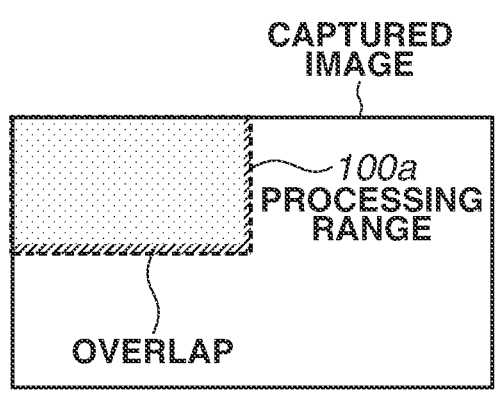

FIG. 12B illustrates, by a dashed line, a range which the division unit 142 cuts out from the captured image and inputs to the image processing processor 100a under the same condition as in FIG. 12A.

The range illustrated in FIG. 12B is a range obtained by adding a number of lines and a number of pixels required for internal processing performed by the signal processing unit 104a to the overlap region with respect to the range indicated by a dashed line in FIG. 12A.

The concept of an overlap region for division into upper and lower portions is similar to that described in the first exemplary embodiment.

For example, also with regard to an overlap region for division into right and left portions, if three pixels both in the rightward and leftward directions are required for internal processing performed by the signal processing unit 104a, the overlap region is set to have seven pixels in total by the addition to the above four pixels.

The image processing processor 100a in the present exemplary embodiment is supposed to have only a little more than one fourth of the processing ability with respect to the frame rate of image capturing, and is thus able to perform processing with the addition of an overlap region having about seven pixels to one-fourth the angle of view of image capturing.

Furthermore, also with regard to the second to fourth image processing processors 100b to 100d, the content of processing thereof is similar to that of the first image processing processor 100a except that the processing targets are upper right, lower left, and lower right divided images.
(Division Processing in Second to Fourth Operation Modes)

Next, division processing performed in the second to fourth operation modes is described with reference to FIGS. 13A, 13B, and 13C.

As with the first exemplary embodiment, also in the present exemplary embodiment, in the second to fourth operation mode, deformations occurring in the captured image due to an angular shake, distortion aberration, and RS distortion are corrected in the respective zones of focal length ranges assigned to the second to fourth operation modes.

Figure 13A:
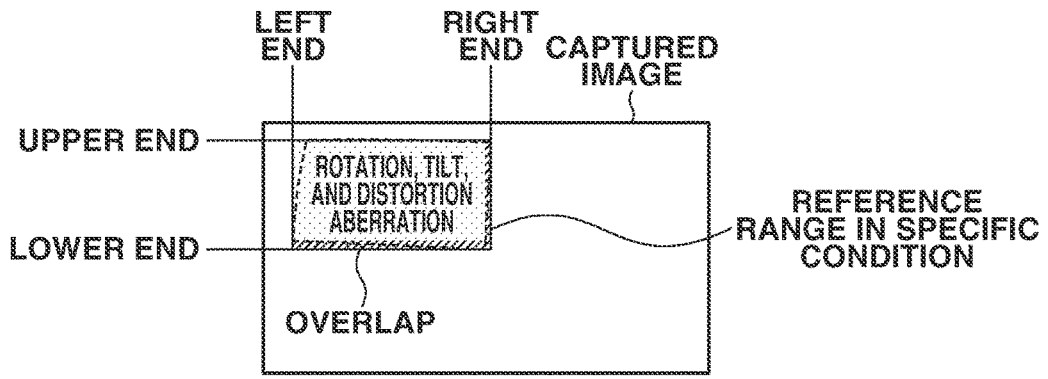
FIGS. 13A, 13B, and 13C are schematic diagrams illustrating division processing in second to fourth operation modes in the second exemplary embodiment.

FIG. 13A illustrates, by a dashed line, a range which the image deformation unit 106a of the first image processing processor 100a refers to under a specific condition with respect to a captured image captured at a given focal length in the second operation mode.

Here, the specific condition refers to a state in which the image deformation unit 106a has performed, in addition to correction to distortion aberration caused by the focal length, corrections to rotation, tilts (horizontal and vertical), and RS distortion (rotation) to a maximum extent.

Also in the present exemplary embodiment, as with the first exemplary embodiment, in the second to fourth operation modes, up to where the reference range expands at a maximum under the specific condition in the range of the focal length assigned to each operation mode is previously calculated to be used.

Figure 13B:
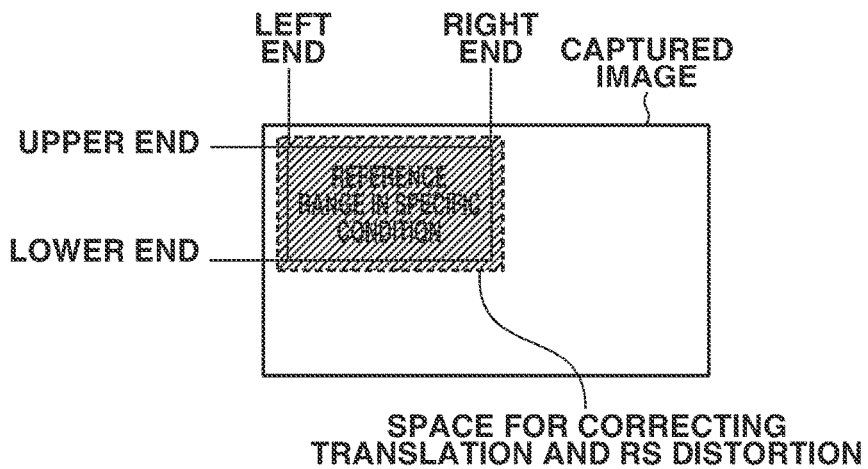

FIG. 13B illustrates, by a dashed line, a divided image which is obtained by additionally providing a region for correction to translations (horizontal and vertical) and RS distortions (horizontal and vertical) of the remaining deformation components to a surrounding area of the above reference range illustrated in FIG. 13A and which is stored in the image memory 105*a*.

The image deformation unit 106*a* performs corrections to translations (horizontal and vertical) and RS distortions (horizontal and vertical) in such a range as not to exceed this region.

Figure 13C:
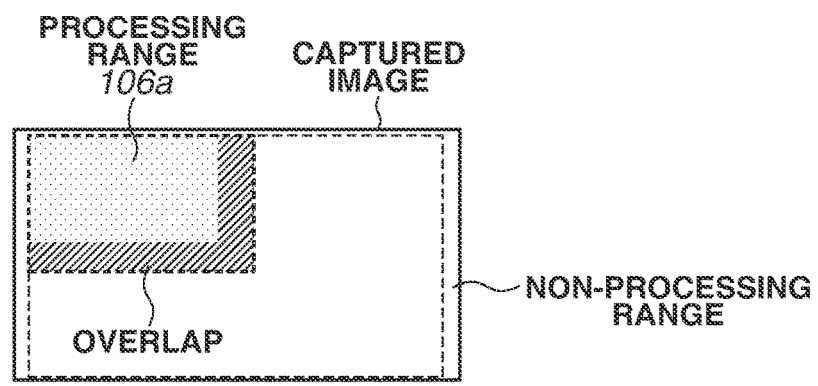

FIG. 13C illustrates, by a dashed line, a processing range of the image processing processor 100*a* obtained by adding a number of lines in the vertical direction and a number of pixels in the horizontal direction required for internal processing performed by the signal processing unit 104*a* to the overlap region with respect to the divided image stored in the image memory 105*a* illustrated in FIG. 13B.

As compared with the first operation mode illustrated in FIG. 12B, since the readout position varies in the upward and downward directions and the rightward and leftward directions even at the boundary portions, the overlap region is expanded.

However, the entire range indicated by a dashed line in FIG. 13C needs to be of a size that is able to be processed within a predetermined time with the processing ability of the image processing processor 100*a*.

Also in the imaging apparatus according to the present exemplary embodiment, as with the first exemplary embodiment, when performing deformation of a captured image, the image deformation unit 106*a* additionally performs expansion at a predetermined expansion rate, so that the reference range is narrowed in the horizontal and vertical directions in such a manner that the processing range to be processed by the image processing processor 100*a* falls within the processing ability thereof.

A non-processing range, which is other than the processing range to be processed by the image processing processor 100*a*, indicated by a dashed line, and a processing range to be processed by another image processing processor, indicated by a dashed line, is discarded by the division unit 142.

Furthermore, also with regard to the second to fourth image processing processors 100*b* to 100*d*, the content of processing thereof is similar to that of the image processing processor 100*a* except that the processing targets are upper right, lower left, and lower right divided images.

According to the imaging apparatus in the present exemplary embodiment, an input image is divided into upper and lower portions and right and left portions, and image processing is performed with a plurality of image processing processors.

In that case, a shake occurring in a captured image due to movement of the imaging apparatus can be corrected with a minimum video delay amount within the range of a predetermined image processing ability.

While, in each of the first and second exemplary embodiments, an example in which division is performed with the optical center as a boundary line, division can be performed with a boundary line that does not pass through the optical center.

For example, division into four portions vertically arranged in a strip-shaped manner can be employed or division into four portions horizontally arranged can be employed.

In those cases, since the variation of the readout position due to the correction of distortion aberration becomes large even at a boundary line or an overlap region thereof, the size of the overlap region can be determined in consideration of this variation.

Furthermore, in the first and second exemplary embodiments, the image deformation unit of each image processing processor performs correction to an angular shake due to projection transform, correction to distortion aberration, and correction to RS distortions (horizontal, vertical, and rotation).

Additionally, other deformations such as cylindrical conversion may be performed. In that case, an overlap region required for a divided image can be obtained in consideration of applied deformation factors and can be used for processing.

Furthermore, while, in the first exemplary embodiment, the range of focal length is divided into three zones to calculate the overlap amount and the expansion rate, the actually required overlap amount and the expansion rate required for that processing can be obtained every time the focal length changes.

Moreover, while, in the first and second exemplary embodiments, the cut-out divided images are equal in size, divided images with different sizes can be cut out according to, for example, the processing ability of each image processing processor.

Aspects of the invention can also be implemented in the following manners. A storage medium storing program code of software in which the procedure for implementing the functions of each of the above-described exemplary embodiments is written is supplied to a system or apparatus.

Then, a computer (alternatively, a central processing unit (CPU) or a microprocessing unit (MPU)) of the system or apparatus reads out and executes the program code stored in the storage medium.

In this case, the program code itself read out from the storage medium implements functions of embodiments of the invention, and a storage medium and a program storing the program code configure embodiments of the invention.

Furthermore, examples of the storage medium for supplying the program code include a flexible disc, a hard disk, an optical disc, and a magneto-optical disc.

Moreover, for example, a CD-ROM, a CD-R, a CD-RW, a DVD-ROM, a DVD-RAM, a DVD-RW, a DVD-R, a magnetic tape, a non-volatile memory card, and a ROM can also be used.

Additionally, making the program code read out by the computer executable enables implementing the functions of each of the above-described exemplary embodiments.

Besides, for example, an operating system (OS) running on a computer can perform a part or the whole of the actual processing based on an instruction of the program code, and the functions of each of the above-described exemplary embodiments can be implemented by the processing.

Furthermore, the following operation can also be performed. First, program code read out from a storage medium is written into a memory included in a function expansion board inserted into the computer or a function expansion unit connected to the computer.

Then, for example, a CPU included in the function expansion board or function expansion unit performs a part or the whole of the actual processing based on an instruction of the program code.

Moreover, embodiments of the invention can be applied to not only an apparatus primarily intended to capturing an image, such as a digital camera, but also an optional apparatus having an imaging apparatus incorporated therein or connected externally, such as a mobile phone, a personal computer (for example, laptop type, desktop type, or tablet type), and a gaming machine. Accordingly, the term "imaging apparatus" in the context of the present specification is intended to involve an optional electronic apparatus having an image capturing function.

According to exemplary embodiments, in a case where an input image is divided into divided images and a plurality of image processing processors performs image processing on the divided images, shaking occurring in a captured image due to movement of an imaging apparatus can be corrected within the range of a predetermined image processing ability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-153916 filed Aug. 4, 2016, which is hereby incorporated by reference herein in its entirety.

What is claimed is:

1. An image processing apparatus comprising:
one or more processors; and
memory storing executable instructions, which when executed by the one or more processors, cause the image processing apparatus to:
divide one frame image into a plurality of divided images;
perform a plurality of image processing processes to respectively process the plurality of divided images; and
combine the divided images respectively subjected to image deformation processing by the plurality of image processing processes,
wherein an amount of overlap between the plurality of divided images is changed according to a deformation amount of the image deformation processing performed on the divided image calculated by the image processing process, and
wherein the amount of overlap between the plurality of divided images in a case where the deformation amount of the image deformation processing performed on the divided image calculated by the image processing process is greater than a predetermined value is larger than the amount of overlap between the plurality of divided images in a case where the deformation amount of the image deformation processing performed on the divided image calculated by the image processing process is less than the predetermined value.

2. An image processing apparatus comprising:
one or more processors; and
memory storing executable instructions, which when executed by the one or more processors, cause the image processing apparatus to:
divide one frame image into a plurality of divided images;
perform a plurality of image processing processes to respectively process the plurality of divided images; and
combine the divided images respectively subjected to image deformation processing by the plurality of image processing processes,
wherein an amount of overlap between the plurality of divided images is changed according to a deformation amount of the image deformation processing performed on the divided image calculated by the image processing process, and
wherein the amount of overlap between the plurality of divided images is changed according to a focal length of an imaging optical system.

3. The image processing apparatus according to claim 2, wherein the amount of overlap between the plurality of divided images in a case where the focal length is greater than a predetermined value is smaller than the amount of overlap between the plurality of divided images in a case where the focal length is less than the predetermined value.

4. An image processing apparatus comprising:
one or more processors; and
memory storing executable instructions, which when executed by the one or more processors, cause the image processing apparatus to:
divide one frame image into a plurality of divided images;
perform a plurality of image processing processes to respectively process the plurality of divided images; and
combine the divided images respectively subjected to image deformation processing by the plurality of image processing processes,
wherein an amount of overlap between the plurality of divided images is changed according to a deformation amount of the image deformation processing performed on the divided image calculated by the image processing process, and
wherein a size of a cutout range for the divided images is changed according to an image size which each of the image processing processes is able to process per unit time.

5. The image processing apparatus according to claim 1, wherein the one frame image is divided into at least two divided images in at least one of a horizontal direction and a vertical direction.

6. An image processing apparatus comprising:
one or more processors; and
memory storing executable instructions, which when executed by the one or more processors, cause the image processing apparatus to:

divide one frame image into a plurality of divided images;

perform a plurality of image processing processes to respectively process the plurality of divided images; and combine the divided images respectively subjected to image deformation processing by the plurality of image processing processes, wherein an amount of overlap between the plurality of divided images is changed according to a deformation amount of the image deformation processing performed on the divided image calculated by the image processing process, and wherein the image deformation processing includes at least one of projection transform correction, rolling-shutter distortion correction, and cylindrical conversion correction, and is processing for calculating the amount of overlap by calculating a maximum amount of movement of pixel position caused by the image deformation processing with respect to a boundary portion between the plurality of divided images.

7. An image processing method comprising:

dividing one frame image into a plurality of divided images;

performing a plurality of image processing processes to respectively process the plurality of divided images; and combining the divided images respectively subjected to image deformation processing by the plurality of image processing processes, wherein an amount of overlap between the plurality of divided images is changed according to a deformation amount of the image deformation processing performed on the divided image calculated by the image processing process, and wherein the amount of overlap between the plurality of divided images in a case where the deformation amount of the image deformation processing performed on the divided image calculated by the image processing process is greater than a predetermined value is larger than the amount of overlap between the plurality of divided images in a case where the deformation amount of the image deformation processing performed on the divided image calculated by the image processing process is less than the predetermined value.

8. An image processing method comprising:

dividing one frame image into a plurality of divided images;

performing a plurality of image processing processes to respectively process the plurality of divided images; and combining the divided images respectively subjected to image deformation processing by the plurality of image processing processes, wherein an amount of overlap between the plurality of divided images is changed according to a deformation amount of the image deformation processing performed on the divided image calculated by the image processing process, and wherein the amount of overlap between the plurality of divided images is changed according to a focal length of an imaging optical system.

9. An image processing method comprising:

dividing one frame image into a plurality of divided images;

performing a plurality of image processing processes to respectively process the plurality of divided images; and combining the divided images respectively subjected to image deformation processing by the plurality of image processing processes, wherein an amount of overlap between the plurality of divided images is changed according to a deformation amount of the image deformation processing performed on the divided image calculated by the image processing process, and wherein a size of a cutout range for the divided images is changed according to an image size which each of the image processing processes is able to process per unit time.

10. An image processing method comprising:

dividing one frame image into a plurality of divided images;

performing a plurality of image processing processes to respectively process the plurality of divided images; and combining the divided images respectively subjected to image deformation processing by the plurality of image processing processes, wherein an amount of overlap between the plurality of divided images is changed according to a deformation amount of the image deformation processing performed on the divided image calculated by the image processing process, and wherein the image deformation processing includes at least one of projection transform correction, rolling-shutter distortion correction, and cylindrical conversion correction, and is processing for calculating the amount of overlap by calculating a maximum amount of movement of pixel position caused by the image deformation processing with respect to a boundary portion between the plurality of divided images.

* * * * *